United States Patent [19]

Lee

[11] Patent Number: 4,973,851

[45] Date of Patent: Nov. 27, 1990

[54] CURRENCY VALIDATOR

[75] Inventor: Larry F. Lee, Grand Rapids, Mich.

[73] Assignee: Rowe International, Inc., Whippany, N.J.

[21] Appl. No.: 335,717

[22] Filed: Apr. 7, 1989

[51] Int. Cl.[5] .................... G06K 5/00

[52] U.S. Cl. .................... 250/556; 356/71; 382/7

[58] Field of Search .............. 250/556; 356/71; 382/7, 382/34

[56] References Cited

U.S. PATENT DOCUMENTS

| | | | |
|---|---|---|---|
| 3,246,295 | 4/1966 | De Claris et al. | 340/146.3 |
| 3,966,047 | 6/1976 | Steiner | 209/75 |
| 4,131,879 | 12/1978 | Ehrat | 340/146.3 H |
| 4,179,685 | 12/1979 | O'Maley | 340/146.3 H |
| 4,283,708 | 8/1981 | Lee | 340/146.3 Z |
| 4,386,432 | 5/1983 | Nakamura et al. | 382/7 |
| 4,399,553 | 8/1983 | Toyama | 382/7 |
| 4,550,433 | 10/1985 | Takahashi | 382/7 |
| 4,588,292 | 5/1986 | Collins | 356/71 |

FOREIGN PATENT DOCUMENTS 2088051 6/1982 United Kingdom .

*Primary Examiner*—David C. Nelms

*Assistant Examiner*—Que Tan Le

*Attorney, Agent, or Firm*—Shenier & O'Connor

[57] ABSTRACT

An article of paper currency to be validated is scanned magnetically along the front to obtain a set of magnetic sample values and optically along the back to obtain a set of optical sample data values. Position-shifted versions of the magnetic data values are compared with stored sets of magnetic reference values for various denominations to obtain error figures for each denomination and degree of position shifting tested. A first indication of the denomination of the currency is generated on the basis of the least of the error figures so obtained. Position-shifted and amplitude-shifted versions of the optical data values are similarly compared with stored sets of optical reference values for various denominations to obtain error figures for each denomination and combination of position and amplitude shifting tested. A second indication of the denomination of the currency is generated on the basis of the least of the error figures obtained by this latter method and compared with the first indication. If the two indications of denomination correspond and the least error figures obtained by the two methods fall within predetermined limits, a credit signal is generated indicating a genuine bill of the indicated denomination.

23 Claims, 16 Drawing Sheets

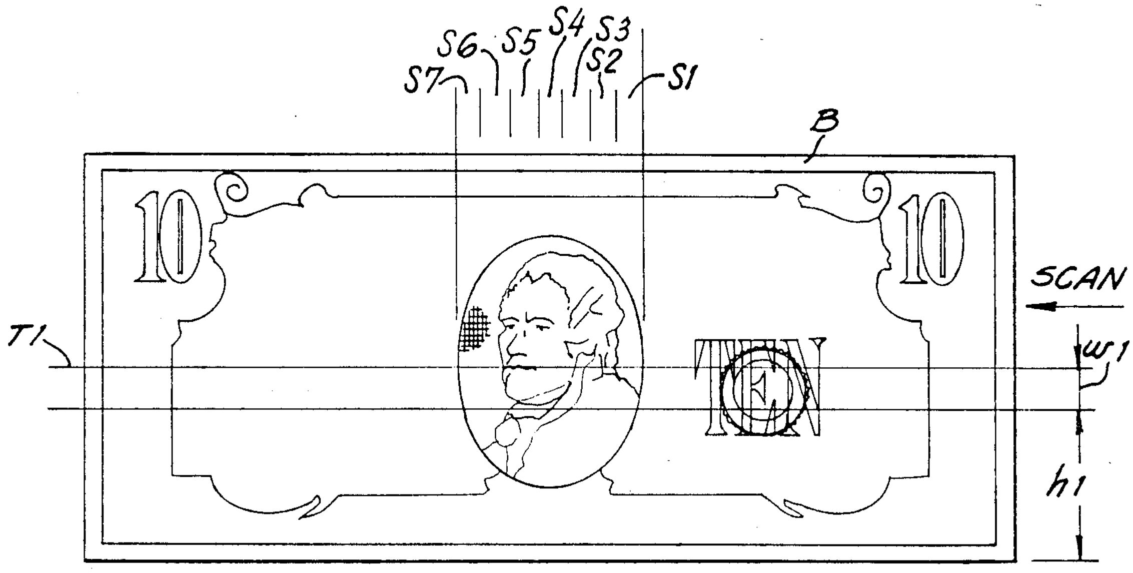
FIG. 4
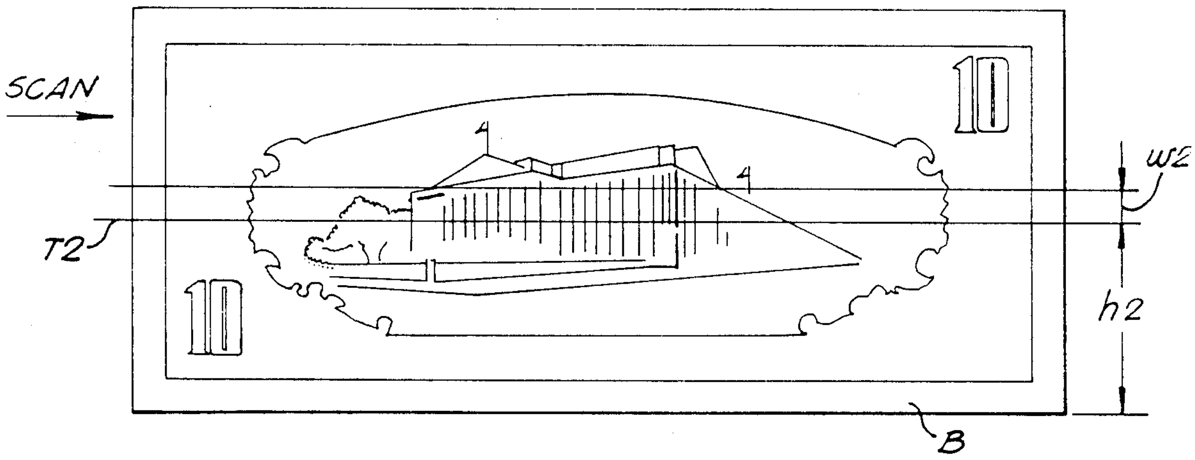
FIG. 5
FIG. 6
| $1 FREQUENCY | $10 FREQUENCY | $5 FREQUENCY | |
|---|---|---|---|
| M2 DATA (0) | M2 DATA (1) | M2 DATA (2) | SECTION S1 |
| M2 DATA (3) | M2 DATA (4) | M2 DATA (5) | SECTION S2 |
| M2 DATA (6) | M2 DATA (7) | M2 DATA (8) | SECTION S3 |
| M2 DATA (9) | M2 DATA (10) | M2 DATA (11) | SECTION S4 |
| M2 DATA (12) | M2 DATA (13) | M2 DATA (14) | SECTION S5 |
| M2 DATA (15) | M2 DATA (16) | M2 DATA (17) | SECTION S6 |
| M2 DATA (18) | M2 DATA (19) | M2 DATA (20) | SECTION S7 |

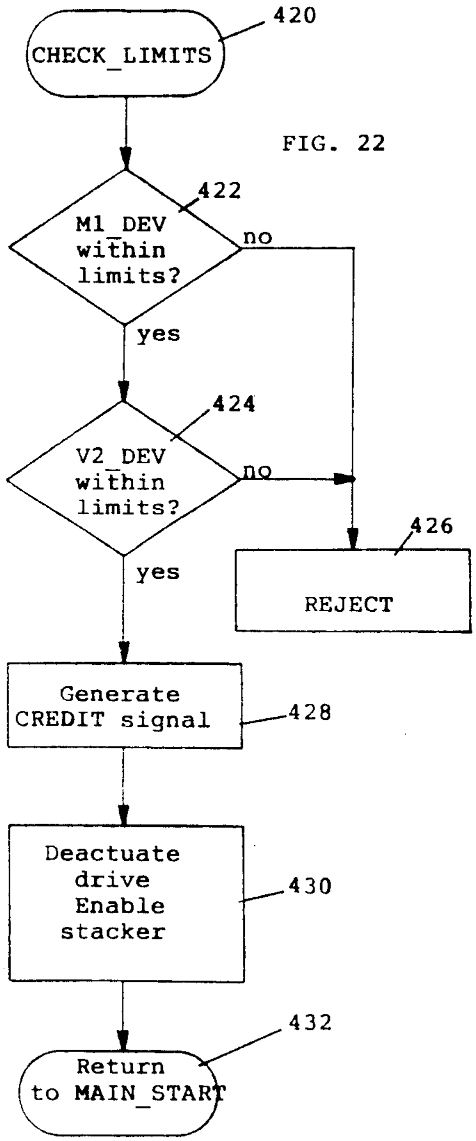
FIG. 22
FIG. 23
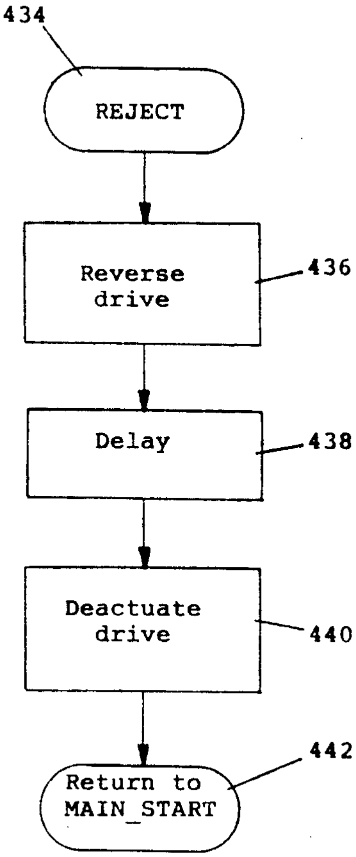

CURRENCY VALIDATOR

BACKGROUND OF THE INVENTION

This invention relates to a system for identifying documents and, more particularly, to a system for validating paper currency.

Apparatus for determining the validity of proffered paper currency, either as part of a stand-alone paper currency changer or as past of a vending machine, are well known in the art. Currency validators of this sort are shown in Collins U.S. Pat. No. 4,588,292 and British Patent Specification No. 2,088,051. Typically, such validators move the article of currency past a magnetic or optical sensor to obtain a set of successive sample values indicating the magnetic permeability or optical reflectance of the article of currency along a strip portion. The sample values are compared with a set of reference values indicating the same property of an actual or hypothetical genuine article of currency along that strip, and an indication of the genuineness of the proffered currency is generated as a function of the result of the comparison. In multiple-denomination versions of such validators, the sample values are compared with a plurality of sets of reference values, one set for each denomination, to assign a denomination on the basis of the best match.

Currency validators of the type described above operate on the assumption that the pattern being matched is a fixed distance from the leading edge of the bill, so that the detector signal can be sampled at the proper time on the basis of a leading-edge signal. In practice, the timing of such leading edges is difficult to establish accurately. Even if the timing of such leading edges could be established accurately, the printing process itself introduces variations in the displacement between the leading edge of the sheet and the printing area. Moreover, through wear, a bill can change in length, so that distances between portions of a sample bill along the scan path do not equal the distance between corresponding portions of a reference bill.

Similar types of errors may arise when the sample and reference values are analog signals representing a continuously variable quantity such as reflectance. For various reasons such as aging of the document or degradation of the reflectance sensor, the average of the sample values may vary considerably from the average of the stored reference values. In such an instance, even if the variations in the sample values track those of the reference values, the differences in average value may lead to false rejections of genuine documents. Alternatively, such amplitude offsets between the sample values and the corresponding reference values may result in false acceptances if the sensitivity of the system is lowered to reduce the rate of false rejections.

Because of these variations and sensor deficiencies, prior-art bill validators, when adjusted to reject spurious bills, also tend to reject a large proportion of genuine bills proffered.

SUMMARY OF THE INVENTION

One of the objects of my invention is to provide a document validator which minimizes the false acceptance of spurious documents.

Another object of my invention is to provide a document validator which minimizes the false rejection of genuine documents.

A further object of my invention is to provide a document validator which minimizes the necessity for adjustment.

A still further object of my invention is to provide a document validator which is especially suitable for validating paper currency.

Other and further objects will be apparent from the following description.

In general, my invention contemplates a document validator in which a set of sample or data values indicating a measurable property, such as optical reflectance or magnetic permeability, of a document such as an article of paper currency are obtained, preferably by moving the document along a scanning path past a sensor. A corresponding set of reference values indicating the measurable property along the same portion of the reference document are stored. For each reference document, one of the sets of values (i.e., sample values and reference values) is compared with a plurality of shifted versions of the other set to obtain respective error figures for the shifted versions. The shifting of one set values may be with respect to position along the document, amplitude, or both. An indication of the identity of the document (e.g., genuine or spurious) is generated on the basis of the least of the error figures so obtained.

In a multiple-denomination version of my invention, position-shifted or amplitude-shifted versions of the sample values are compared with stored sets of reference values for the various denominations to obtain error figures for each combination of reference denomination, position-shifting and amplitude shifting. An indication of the denomination and genuineness of the currency is generated on the basis of the least of the error figures obtained for any of the combinations of denomination and shifting.

BRIEF DESCRIPTION OF THE DRAWINGS

In the accompanying drawings to which reference is made in the instant specification and which are to be read in conjunction therewith and in which like reference numerals are used to indicate like parts in the various views:

FIG. 4 is a view of the front side of a typical bill, indicating the magnetic scanning track.

FIG. 5 is a view of the reverse side of the bill shown in FIG. 4, indicating the optical scanning track.

FIG. 6 is a schematic view of the portion of the control system memory used to store frequency data for the portrait areas of various bills.

Figure 3:
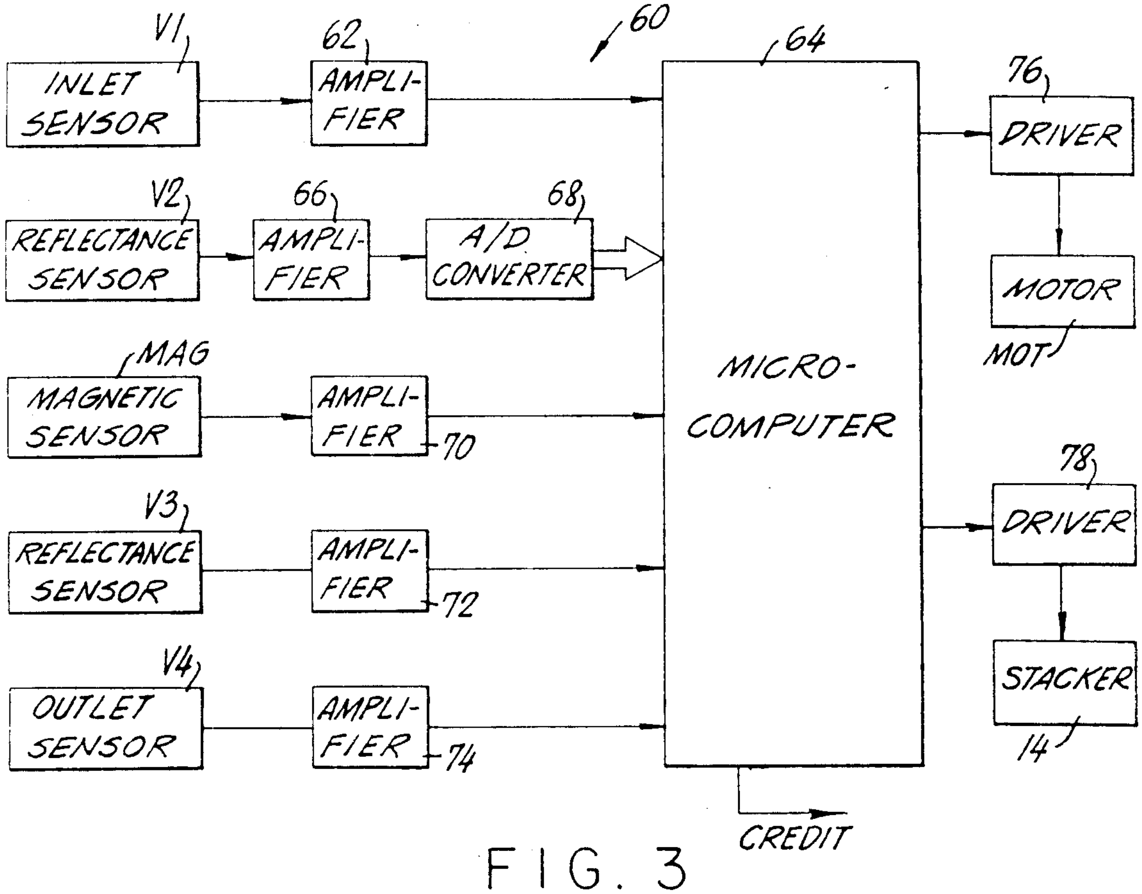
FIG. 3 is a schematic diagram of the control system for the currency acceptor shown in FIG. 1.

FIGS. **9*a* and 9*b* are a flowchart of the data-gathering routine of the control system as shown in FIG. 3**.

Figure 10:
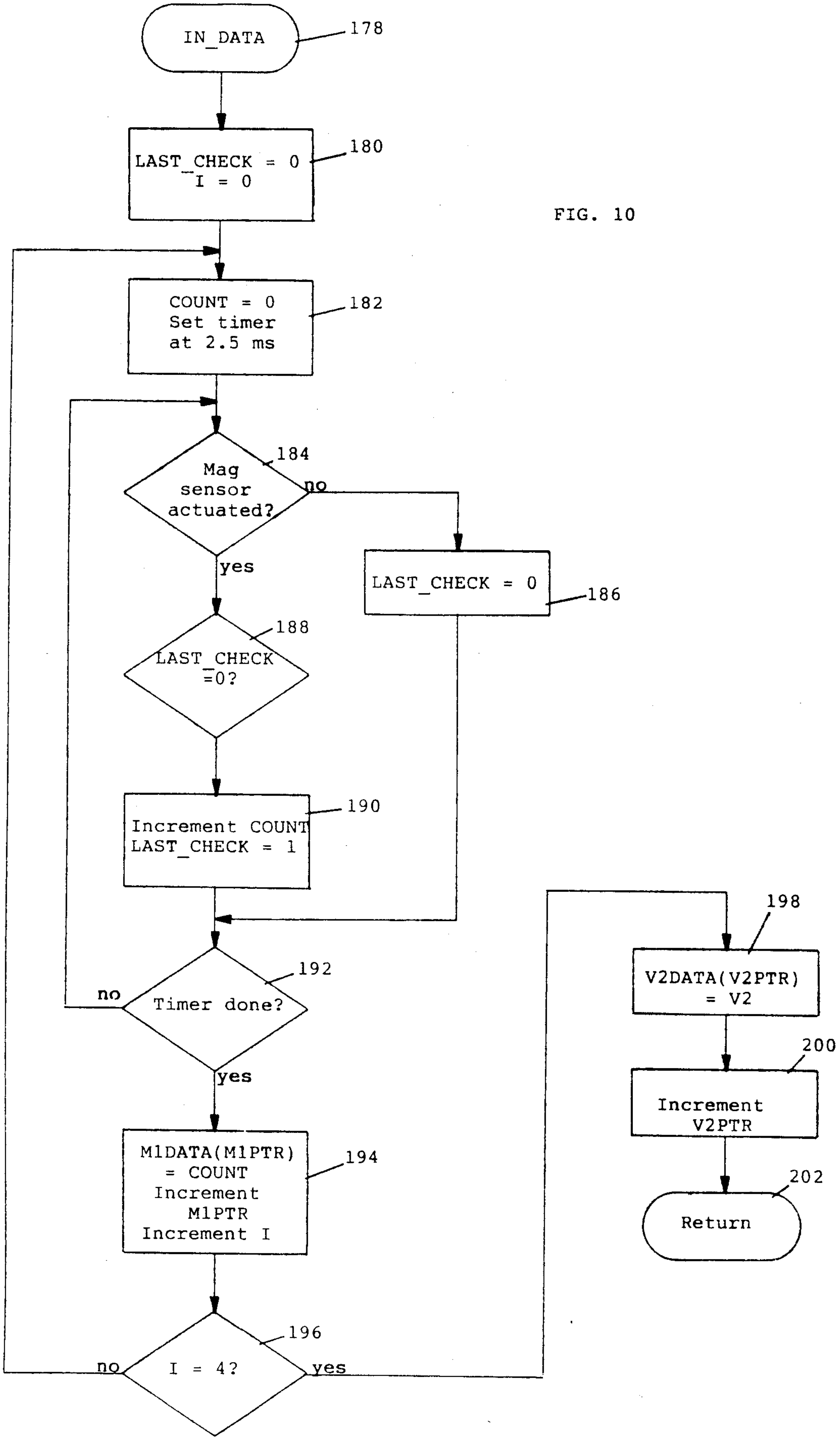

FIG. 10 is a flowchart of the subroutine for obtaining magnetic and optical data that is invoked by the routine shown in FIG. **9*a* and 9*b***.

Figure 11:
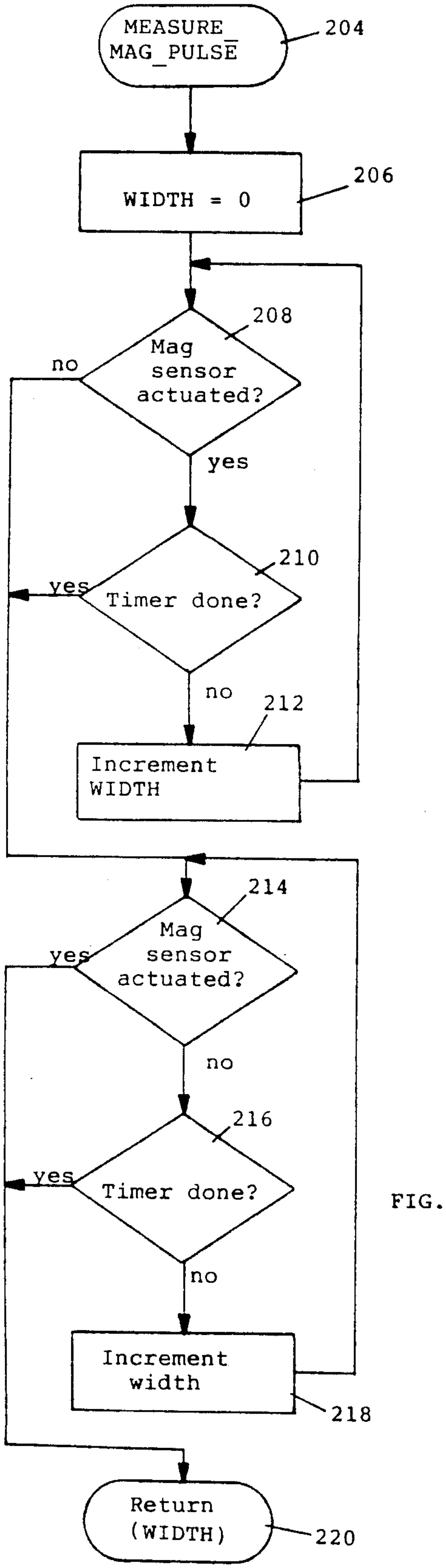

FIG. 11 is a flowchart of the subroutine for measuring magnetic pulse width that is invoked by the routine shown in FIGS. **9*a* and 9*b***.

Figure 12:
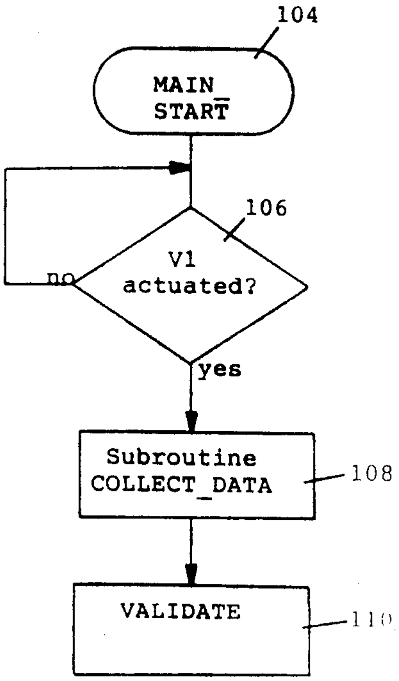

FIG. 12 is a flowchart of the main routine of the control system shown in FIG. 3.

Figure 13:
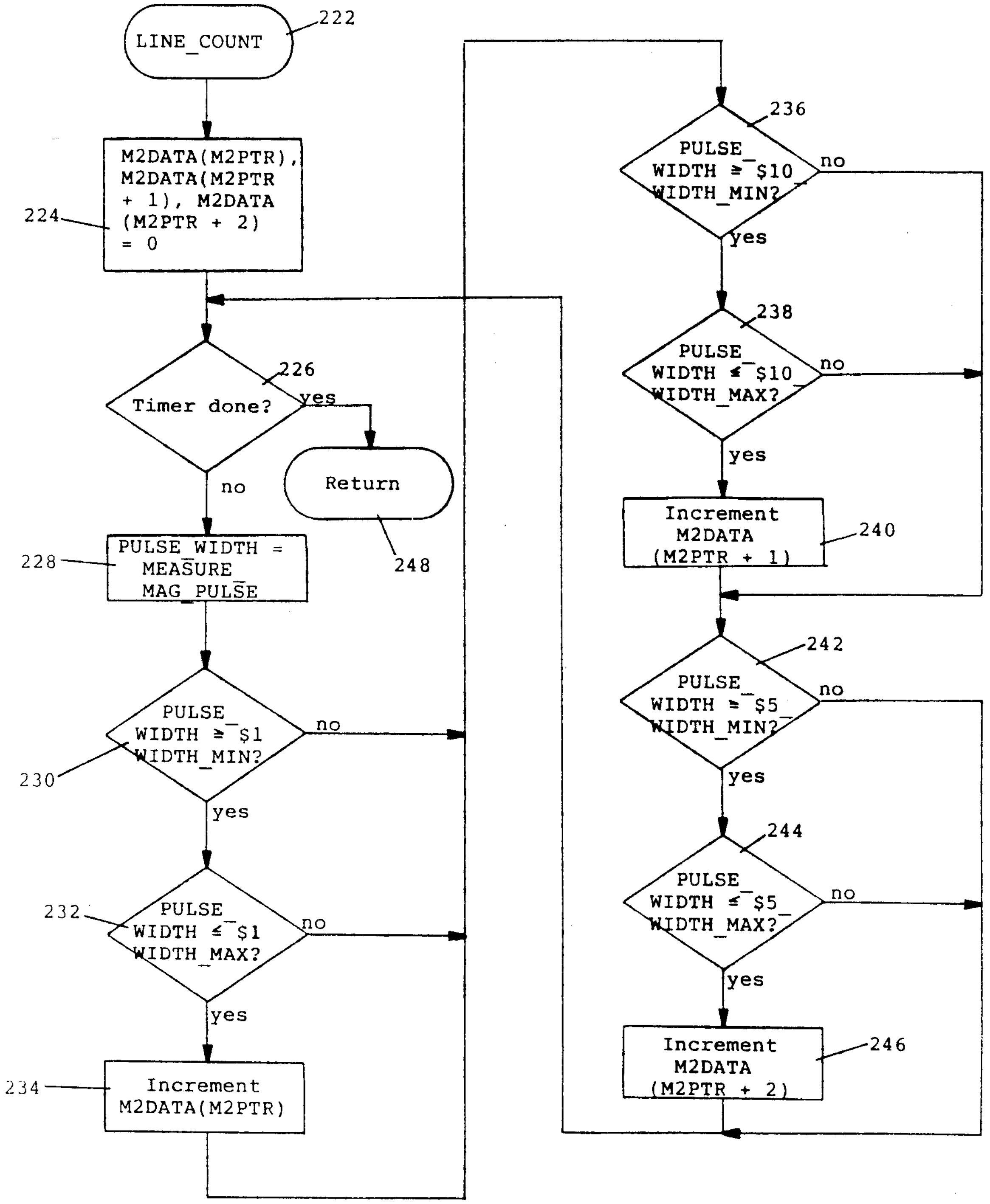

FIG. 13 is a flowchart of a subroutine for counting the lines in the portrait area of the bill shown in FIG. 4.

Figure 2:
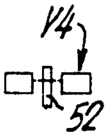
FIG. 2 is a fragmentary rear elevation of the acceptor shown in FIG. 1.
Figure 14A:
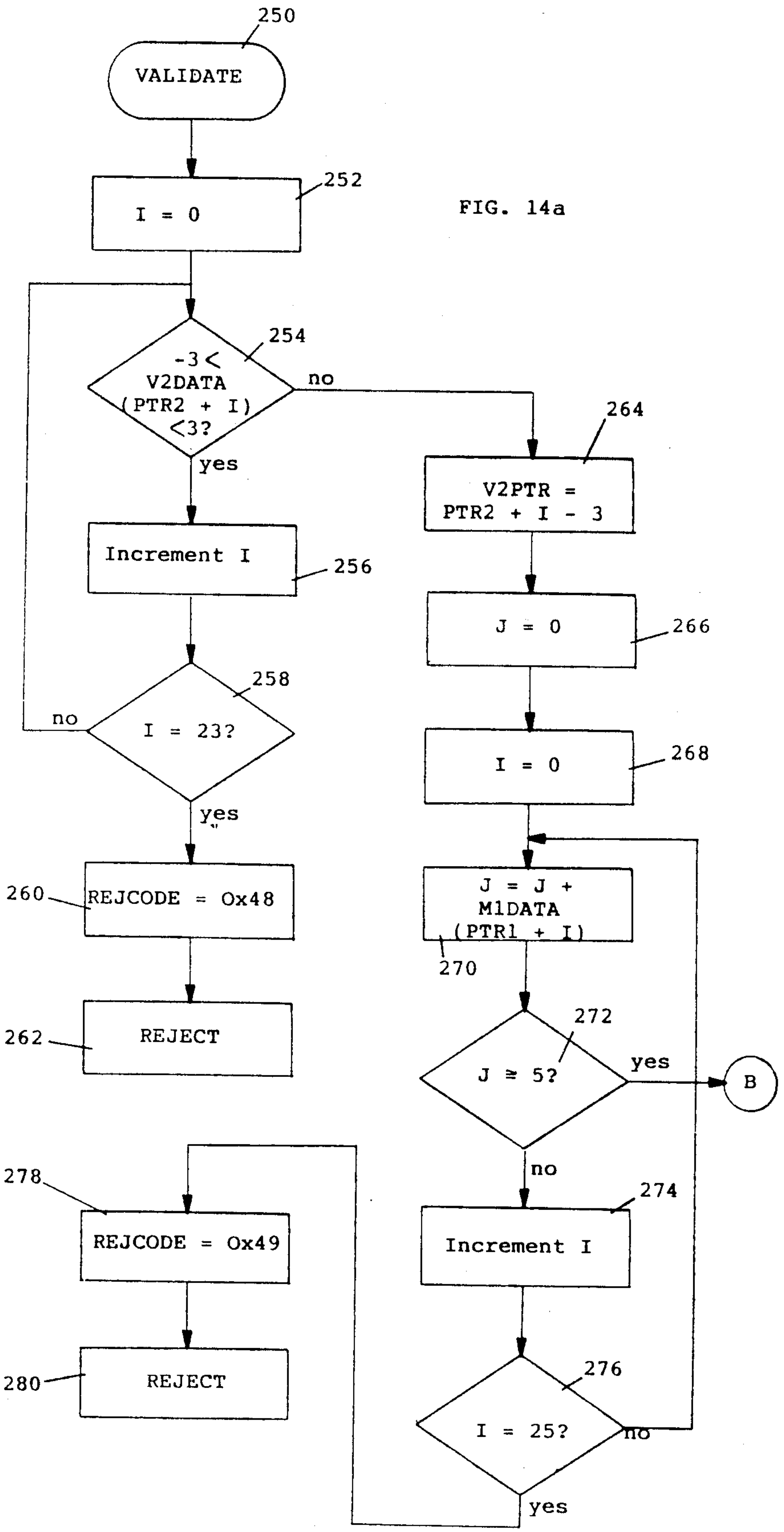
Figure 14B:
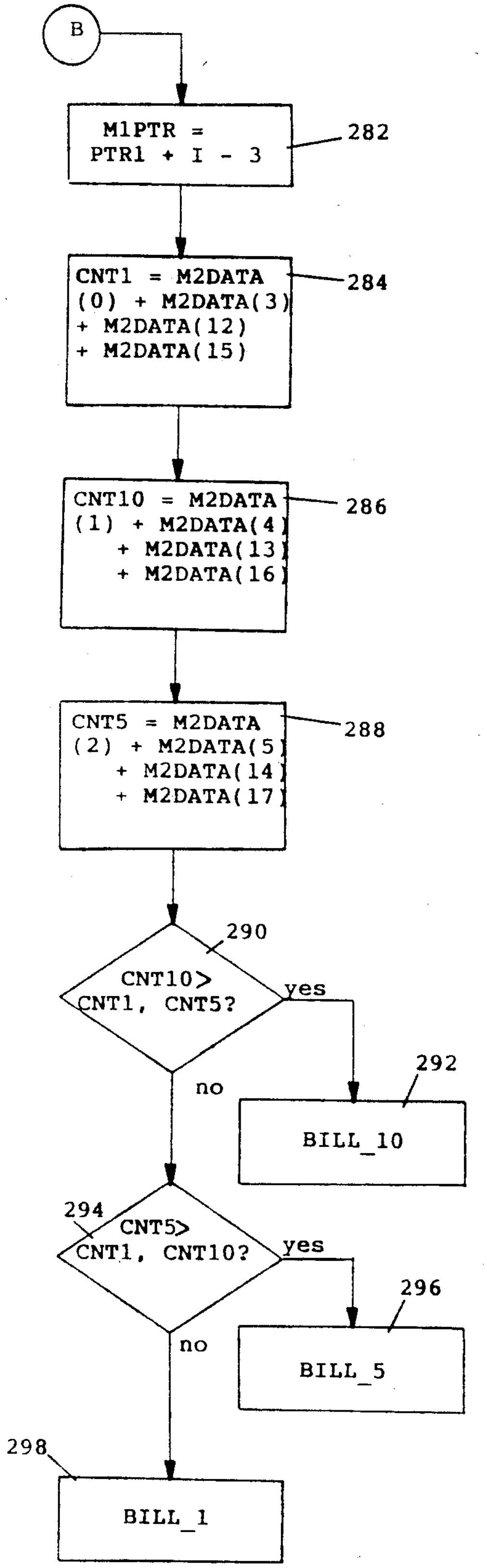

FIGS. 14a and 14b are a flowchart of the validate routine of the control system shown in FIG. 2.

Figure 15:
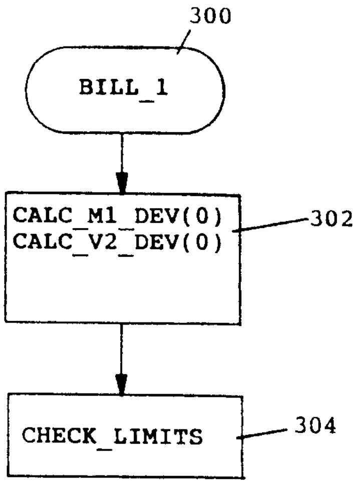

FIG. 15 is a flowchart of the routine for comparing the reference values with the sample values obtained for a $1 bill.

Figure 16:
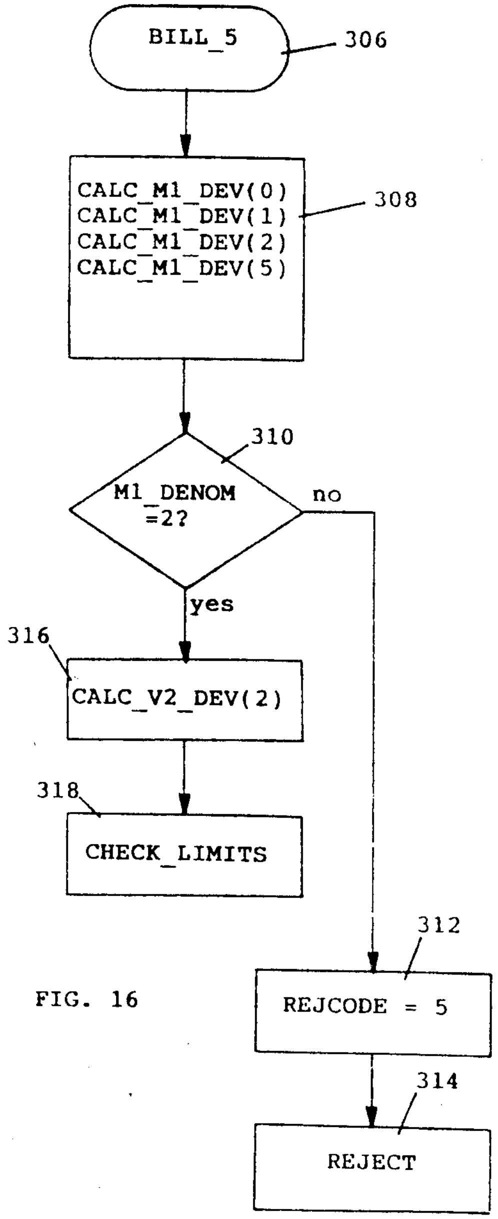

FIG. 16 is a flowchart of the routine for comparing the reference values with the sample values of a $5 bill.

Figure 17:
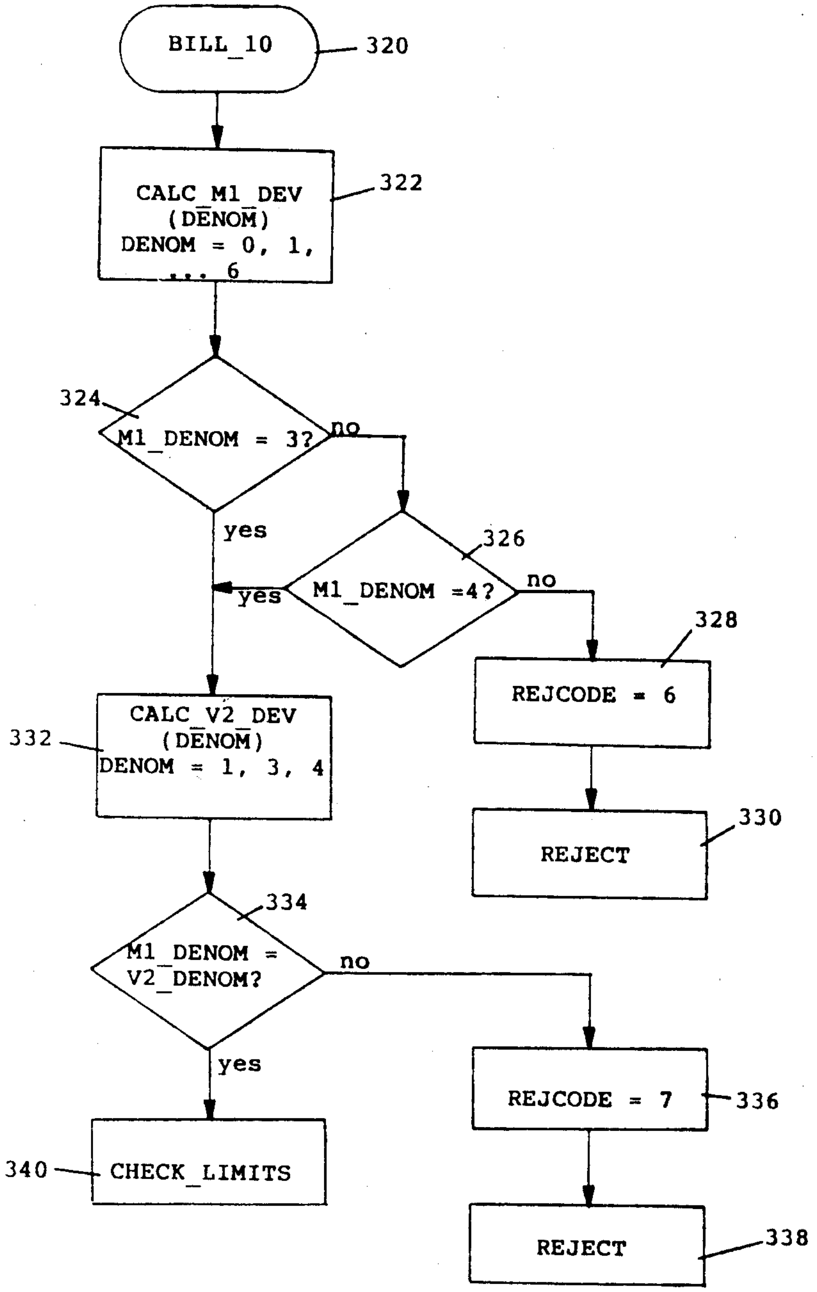

FIG. 17 is a flowchart of the routine for comparing the reference values with the sample values of a $10 or $20 bill.

Figure 18:
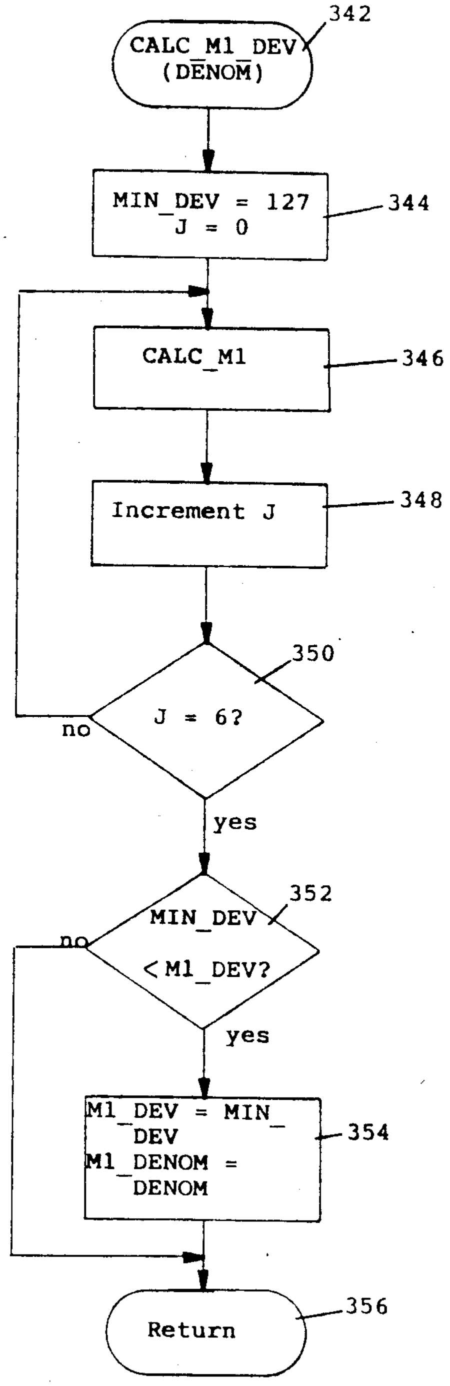

FIG. 18 is a flowchart of the subroutine used to control the shifting of the magnetic data array relative to the magnetic reference array with which it is compared.

Figure 19:
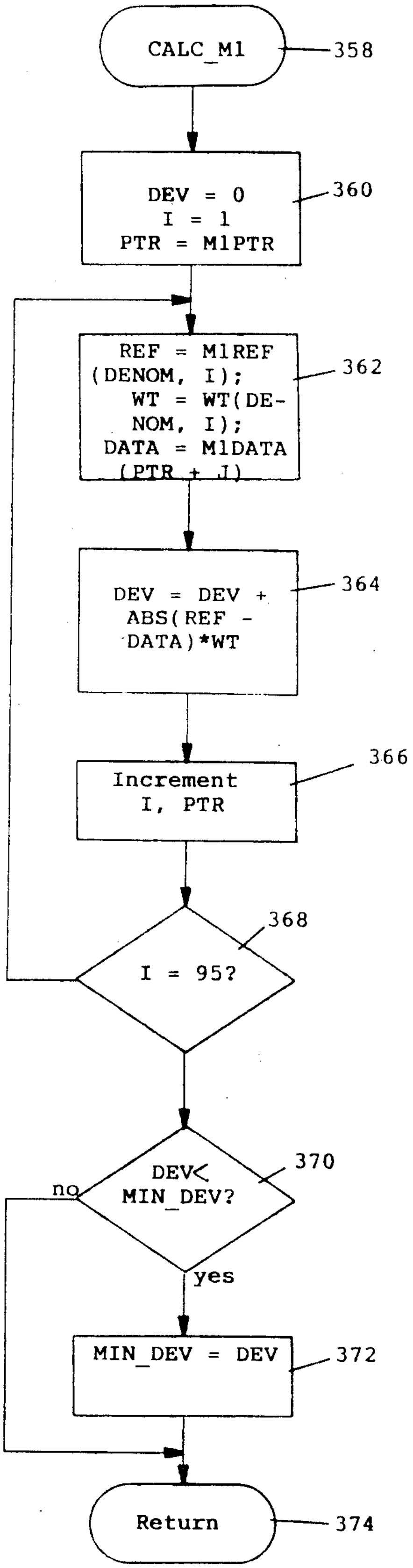

FIG. 19 is a flowchart of the subroutine used to calculate the deviation between the magnetic reference values and the magnetic sample values for a particular denomination and position offset.

Figure 20:
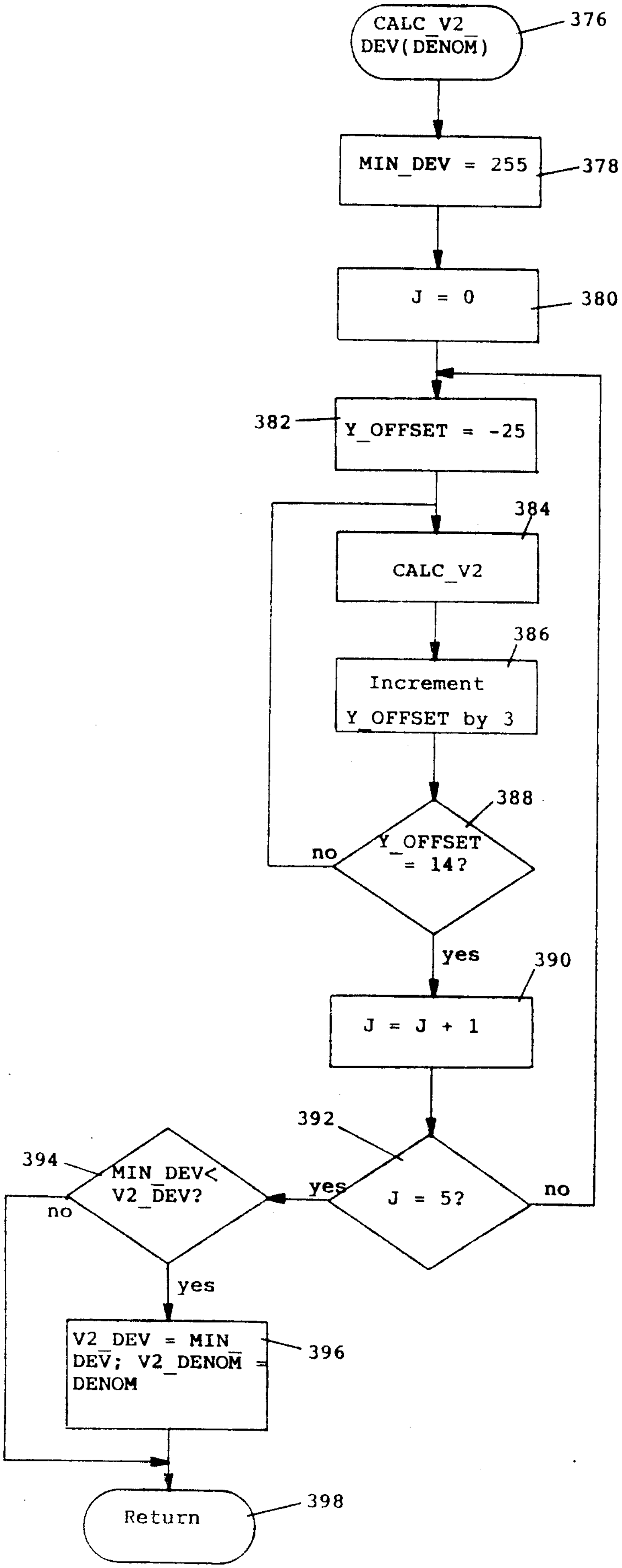

FIG. 20 is a flowchart of the subroutine used to control the position and amplitude offsets of the optical data array relative to the optical reference array with which it is compared.

Figure 21:
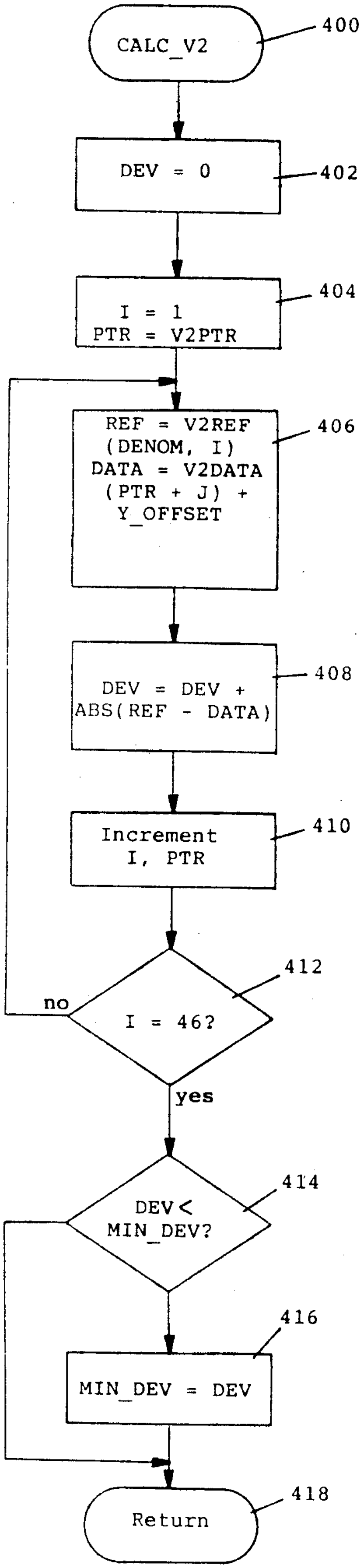

FIG. 21 is a flowchart of the subroutine used to calculate the deviation between the optical data array and optical reference array for a particular denomination and combination of position and amplitude offset.

FIG. 22 is a flowchart of the routine used to check the calculated minimum deviations against predetermined limits and generate an acceptance signal in response thereto.

FIG. 23 is a flowchart of the reject routine of the control system shown in FIG. 3.

DESCRIPTION OF THE PREFERRED EMBODIMENT

Figure 1:
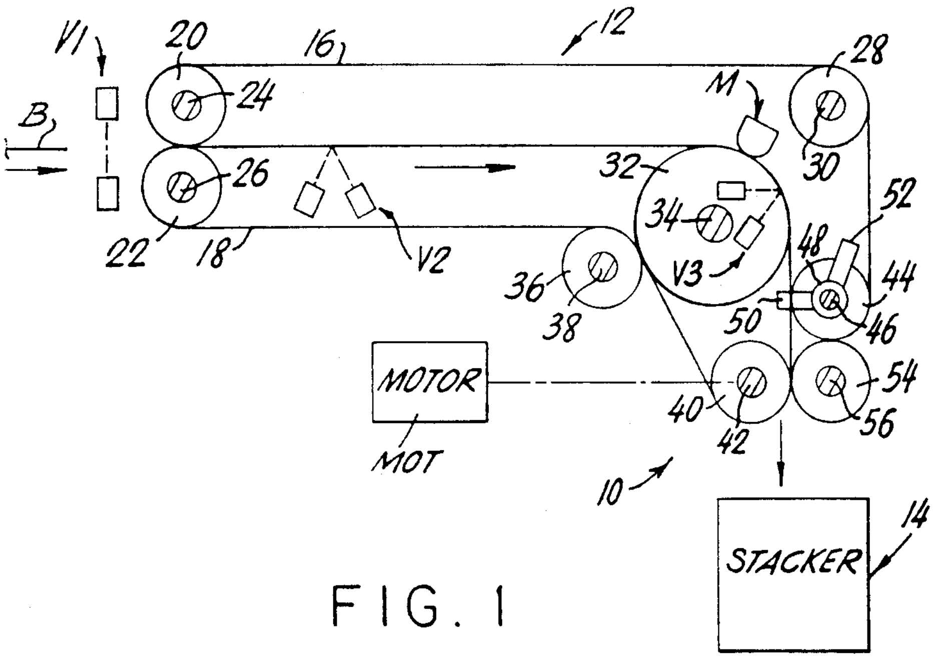
FIG. 1 is a partly schematic right side elevation of a currency acceptor incorporating my validator.

Referring to FIG. 1, a currency acceptor 10 incorporating my invention includes a bill transport 12 for advancing a bill B inserted into an inlet to a stacker 14. A suitable stacker 14 is shown in Okkonen et al U.S. Pat. No. 3,917,260, the specification of which is incorporated herein by reference. Transport 12 comprises upper and lower belts 16 and 18 defining a passage therebetween for receiving bill B. Upper belt 16 is supported by rollers 20, 28 and 44 carried by respective shafts 24, 30 and 46, while lower belt 18 is supported by rollers 22, 32, 36 and 40 supported by respective shafts 26, 34, 38 and 42 to form a generally L-shaped transport path as shown in FIG. 1. Rollers 20 supporting upper belt 16 and rollers 22 supporting lower belt 18 oppose one another to form an inlet. An optical sensor V1 comprising a light source and photodetector disposed respectively below and above the feed path upstream from rollers 20 and 22 senses the insertion of a bill B into the inlet to transport 12. Inlet sensor V1 provides a signal to the control system to be described, which causes the system to energize a motor 58 driving the rollers supporting belts 16 and 18. Motor 58 drives belts 16 and 18 in such a direction as to move the bill B to the right and then downwardly, as viewed in FIG. 1, into the stacker 14. Bill B is inserted lengthwise into the inlet defined by rollers 20 and 22 with the front side facing upwardly and with the right end downstream of the left end with reference to the feed path. A reflectance sensor V2 comprising a light source and photodetector both disposed beneath the feed path downstream from rollers 20 and 22 provides a signal indicating the instantaneous optical reflectance along a track T2 extending along the back side of the bill B (FIG. 5). As shown in FIG. 5, the rear scanning track T2 has a width w2 of preferably about 0.25 inch, and is preferably spaced a distance h2 of approximately 1.25 inches from the lower edge of the bill B.

As the bill B progresses further along the feed path, it follows a 90° downward bend defined by rollers 32. As the bill B advances around the bend, it passes a magnetic head M disposed along the upper side of the feed path. Referring to FIG. 4, magnetic head M provides a signal indicating the instantaneous magnetic permeability along a scanning track T1 along the front of the bill B having a width w1 of preferably about 0.25 inch, located a distance h1 of preferably about 1 inch from the lower edge of the bill. The portion of scanning track T1 passing through the portrait area of the bill B is divided into seven contiguous sections S1–S7, which have been found to have distinguishable line-spacing, or frequency, characteristics for various denominations. As will be explained more fully hereinbelow, the magnetic pulses from each section Sn are examined to determine how many correspond in spacing to those of a genuine $1 bill, $10 bill and $5 bill, respectively. The results of these examinations are stored in an array to be described and used to assign a tentative denomination to the bill B being scanned.

As the bill B continues around the downward bend defined by rollers 32, it passes a second optical reflectance sensor V3 comprising a light source and photodetector located beneath the feed path. Reflectance sensor V3 provides a signal to the control system to be described, indicating that the leading edge of the bill B has reached that point along the feed path.

Referring now also to FIG. 2, the shaft 46 carrying the downstream rollers 44 supporting belt 16 rotatably supports a sleeve 48 carrying a lower lever arm 50 normally extending across the feed path and an upper lever arm 52 normally out of the light path between the light source and photodetector of an optical sensor V4. Movement of the leading edge of the bill B past rollers 44 causes lower arm 50 to pivot counterclockwise, causing upper arm 52 to pivot in the same direction, into the light path, to actuate sensor V4. Sensor V4 serves as an outlet sensor indicating the arrival of the leading edge of the bill B at the outlet, from the bill transport 12. Upon clearing rollers 44, the bill B passes between rollers 40 supporting lower belt 18 and rollers 54 supported by a shaft 56 to be received by the stacker 14.

Referring now to FIG. 3, the control system 60 of the bill acceptor 10 includes a suitably programmed microcomputer 64 of any suitable type known to the art. Microcomputer 64 receives inputs from the various devices shown in FIG. 1 and provides a control signal to the motor 58. More particularly, an amplifier 62 responsive to inlet sensor V1 provides a digital signal to microcomputer 64 indicating the presence of a bill B adjacent the inlet sensor. In a similar manner, an amplifier 66 responsive to reflectance sensor 42 provides an analog input signal to an analog-to-digital (A/D) converter 68, which provides a multibit digital input to microcomputer 64. An amplifier 70 responsive to the magnetic sensor M provides an additional digital input to the computer 64. Respective amplifiers 72 and 74 responsive to path sensor V3 and V4 provide additional digital inputs to microcomputer 64. Microcomputer 64 provides a digital input to a driver 76 to drive motor 58 in either a forward or reverse direction, depending on the input to driver 76. Microcomputer 64 also provides a digital input to a driver 78 coupled to stacker 14.

Referring now to FIG. 6, an M2DATA array 80 in microcomputer 64 consists of 21 memory locations storing values M2DATA(0) through M2DATA(20). These values represent the number of magnetic pulses in each of the sections S1–S7 of the portrait area of the bill B (FIG. 4) corresponding to the frequency of a particular denomination. In general, frequency data for a particular section Sn of the portrait area corresponding to a $1 bill, a $10 bill and a $5 bill are stored as M2DATA(3n−3), M2DATA(3n−2) and M2DATA(3n−1), respectively. Thus, M2DATA(0) represents the number of pulses in section S1 of the portrait area having a frequency characteristic of a $1 bill. Similarly, M2DATA(1) represents the number of pulses in section S1 having a frequency characteristic of a $10 bill, while M2DATA(2) indicates the number of pulses in section S1 having a frequency characteristic of a $5 bill. These quantities M2DATA(0) through M2DATA(20) stored in array 80 are used to assign a tentative denomination to the bill B being examined, as is explained more fully hereinbelow.

Figure 7:
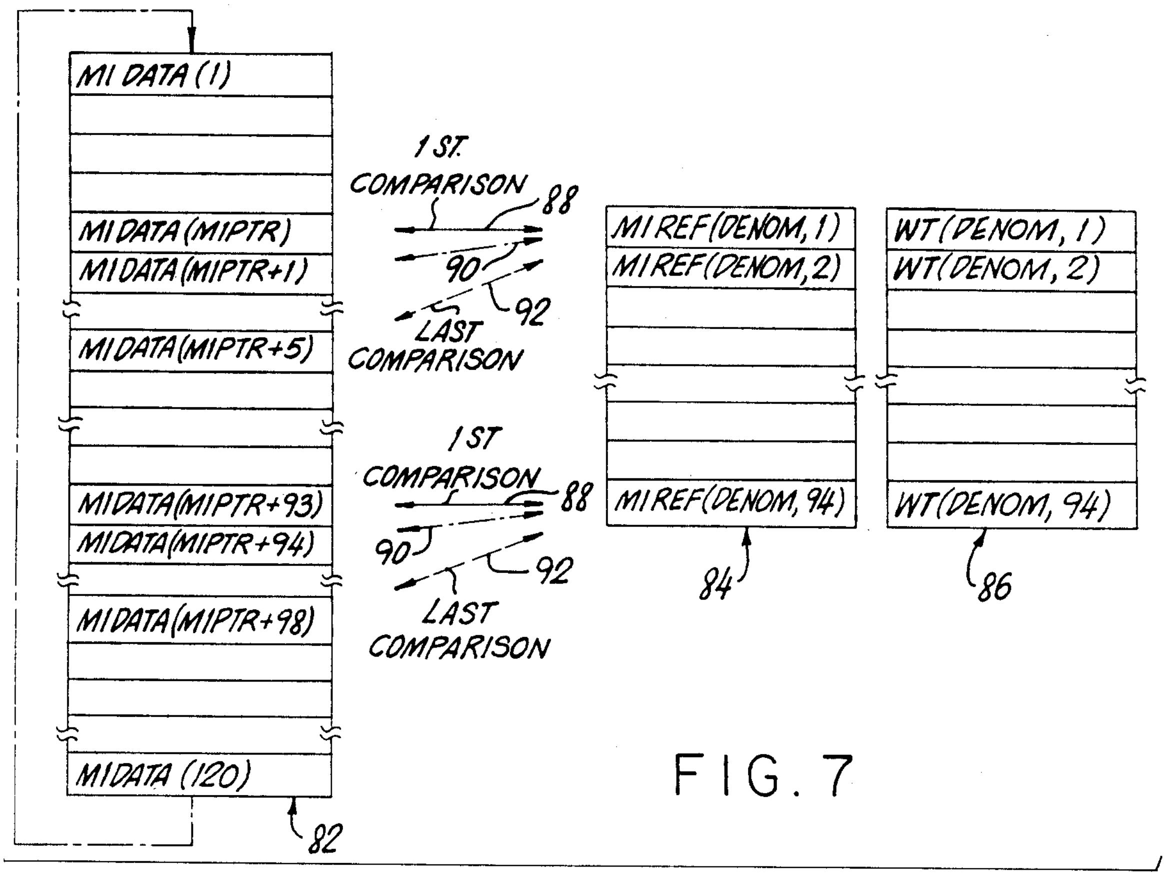
FIG. 7 is a schematic view of the memory locations used to store magnetic reference and data values.

Referring now to FIG. 7, a circular buffer or array 82 in microcomputer 64 stores values M1DATA(1) through M1DATA(120) representing the number of magnetic pulses detected by magnetic sensor M in successive portions of track T1 0.02 inch in length, or 2.5 milliseconds in time assuming a transport speed of 8 inches per second. By "circular" is meant that an array index of less than 1 or greater than 120 is automatically incremented or decremented as required by a multiple of 120 to place the index in an allowable range. Microcomputer 64 also contains, for each bill denomination, a reference array 84 storing values M1REF(DENOM, 1) through M1REF(DENOM, 94), where DENOM ranges between 0 and 6. The variable DENOM indicates the denomination of the reference bill in accordance with the following table:

| DENOM | DENOMINATION |
|---|---|
| 0 | $1 |
| 1 | $2 |
| 2 | $5 |
| 3 | $10 |
| 4 | $20 |
| 5 | $50 |
| 6 | $100 |

The M1DATA array 82 contains more elements than the M1REF array 84 to allow for a variable starting point within the oldest 25 elements of the array, as well as to allow for shifting, in a manner to be described. Values M1REF(DENOM, 1) through M1REF(DENOM, 94) indicate the number of magnetic pulses existing in successive 0.02-inch portions along track T1 of a genuine bill of that denomination, beginning from the right edge of the printed matter along track T1 as shown in FIG. 4. In addition, microcomputer 64 contains, for each denomination, a weighting array 86 of values WT(DENOM, 1) through WT(DENOM, 94), where DENOM is defined as before, indicating the weighting to be assigned to that portion of the comparison. The weighting values are based upon the consistency with which the corresponding value in the reference array 84 indicates a genuine bill, as determined by experience; the more consistent a particular reference value, the higher the corresponding weighting.

During the data-gathering routine to be described, sample magnetic pulse counts are stored in successive locations of M1DATA array 82 is a circular manner, the location M1DATA(1) being accessed after M1DATA(120). Because this routine starts before the leading edge of the bill B reaches magnetic sensor M, the "starting point" of the data array 82 for the purposes of comparison with reference array 84 is in general not M1DATA(1), but M1DATA(M1PTR), where the pointer M1PTR is determined by examining the contents of the array 82 in a subsequently executed routine to be described. In this particular instance, M1PTR is an array index ranging between 1 and 120. In the actual compiled version of the program, M1PTR would be a true pointer, ranging between the address of M1DATA(1) and the address of M1DATA(120), as would the other pointers described herein.

As will be explained more fully hereinbelow, the reference array 84 for each denomination is compared with a plurality of shifted versions of the data array 82 in order to obtain a best match and thereby compensate for any misregistration of the data array 82 relative to the reference array 84. As a particular example, it will be assumed that the starting point in data array 82 is M1DATA(M1PTR). On the first comparison for that denomination, values M1DATA(M1PTR) through M1DATA(M1PTR+93) of data array 82 are compared with respective values M1REF(DENOM, 1) through M1REF(DENOM, 94) of reference array 84, as indicated by arrows 88 in FIG. 7. On each succeeding comparison for that denomination, each value in the reference array 84 is compared with the succeeding value in data array 82. Thus, on the second comparison, values M1DATA(M1PTR+1) through M1DATA(M1PTR+94) of array 82 are compared with values M1REF(DENOM, 1) through M1REF(DENOM, 94) of reference array 84, as indicated by arrows 90. On the final comparison for that denomination, values M1DATA(M1PTR +5) through M1DATA(M1PTR+98) of data array 82 are compared with values M1REF(DENOM, 1) through M1REF(DENOM, 94) of reference array 84, as indicated by arrows 92.

Figure 8:
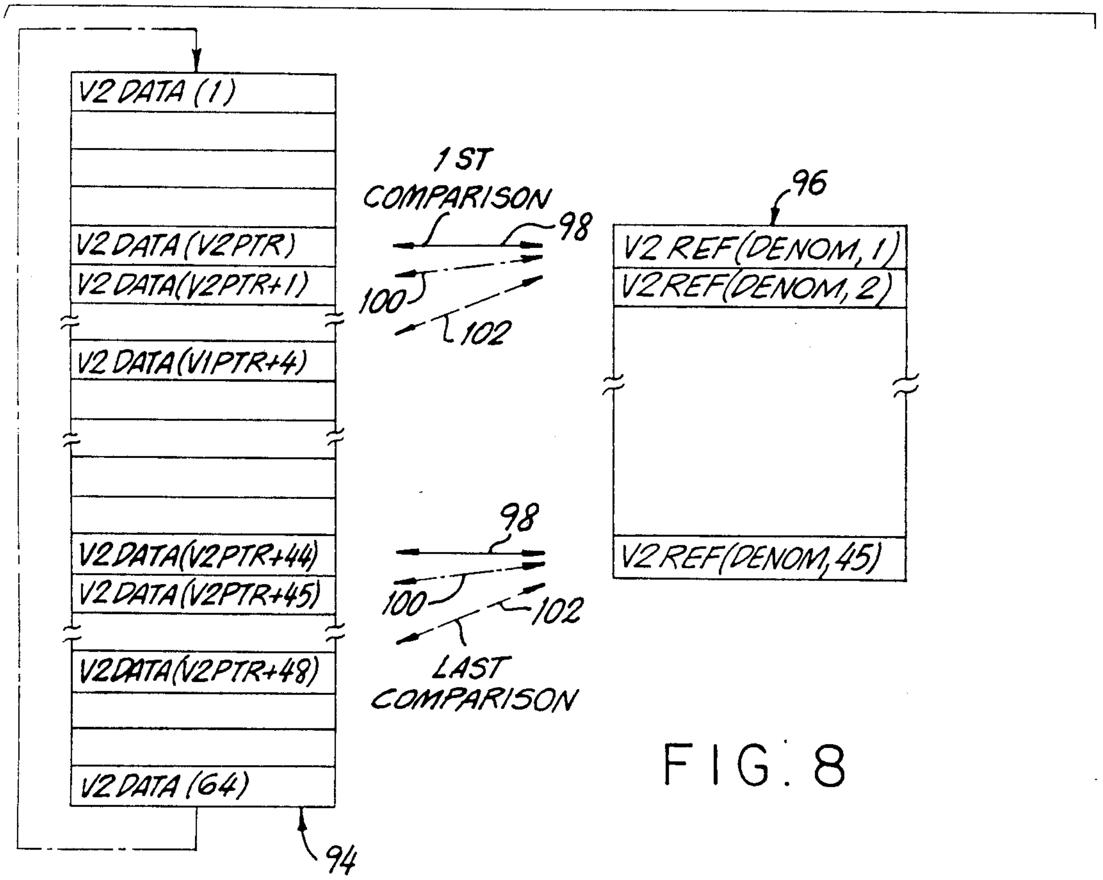
FIG. 8 is a schematic view of the memory locations used to store the optical reference and data values.

Referring now to FIG. 8, microcomputer 64 also contains a circular buffer or array 94 of values V2DATA(1) through V2DATA(64), indicating the optical reflectance of bill B in successive 0.08-inch portions along track T2 on the reverse side (FIG. 5) as measured by reflectance sensor V2 (FIG. 1). V2DATA array 94 is filled in a recirculating manner similar to that of M1DATA array 82. Since the data-gathering routine starts before the bill B reaches reflectance sensor V2, the "starting point" of the array 94 is not V2DATA(1), but V2DATA(V2PTR), where V2PTR is determined by examining the array contents. For each denomination of bill B, microcomputer 64 also contains a reference array 96 storing values V2REF(DENOM, 1) through V2REF(DENOM, 64) indicating the optical reflectance in successive 0.08-inch portions along track T2 of a genuine bill of that denomination.

Each array 96 is compared with successively shifted versions of array 94, in a manner similar to that of arrays 84 and 82, to obtain a best fit between the two arrays and thereby compensate for any initial misregistration of arrays. Thus, on the first comparison for a denomination DENOM, values V2REF(DENOM, 1) through V2REF(DENOM, 45) of array 96 are compared with respective values V2DATA(V2PTR) through V2DATA(V2PTR+44) of data array 94, as indicated by arrows 98 in FIG. 8. On the second comparison for that denomination, V2REF(DENOM, 1) through V2REF(DENOM, 45) of reference array 96 are compared with respective values V2DATA(PTR+1) through V2DATA(PTR+45) of data array 94 as indicated by arrows 100. On the final comparison, values V2REF(DENOM, 1) through V2REF(DENOM, 45) of reference array 96 are compared with values V2DATA(V2PTR+4) through V2DATA(V2PTR+48) of data array 94, as indicated by arrows 102 in FIG. 8.

In contrast to the pulses from the magnetic sensor M, which are assumed to be either on or off, the output from reflectance sensor V2 is an analog signal which may take on any one of a number of values. Any amplitude offset between the sample reflectance values and the reference reflectance values can lead to false rejections or acceptances in a manner similar to that occasioned by misregistration of the leading edge of the bill B. To compensate for this possible offset of reflectance amplitudes, each comparison for a particular denomination is performed for a plurality of shifts in the amplitudes of the values in data array 94.

Referring now to FIG. 12, upon startup (step 104), the acceptor 10 waits for inlet sensor V1 to be actuated by insertion of a bill B into the nip formed by rollers 20 and 22 (step 106). Upon actuation of inlet sensor V1, the acceptor enters the COLLECT_DATA routine (FIGS. *9a* and *9b*) to gather the magnetic and optical data from the front and back of the bill B (step 108). Upon completion of the COLLECT_DATA subroutine, the acceptor enters the VALIDATE routine (FIGS. 14*a* and 14*b*) for analyzing the data thus gathered to determine the genuineness and denomination of the bill B (step 110).

Referring now to FIGS. *9a* and *9b*, upon entering the COLLECT_DATA subroutine (step 114), the acceptor initializes respective pointers M1PTR and V2PTR used as indices for M1DATA array 82 (FIG. 7) and V2DATA array 94 (FIG. 8) (step 116). The acceptor then energizes the transport motor 58 (step 118) and sets a timer at 2.5 seconds (step 120).

The acceptor then enters a data-gathering loop (steps 122–142) in which it remains until path sensor V3 (FIG. 1) is actuated. On each pass through this loop, the acceptor enters the IN_DATA subroutine of FIG. 10 (step 142) to fill data arrays 82 and 94 (FIGS. 7 and 8) with magnetic data and optical data, respectively. When all of the locations in a particular data array 82 or 94 have been filled, the acceptor overwrites previously stored data in a circular fashion, overwriting the locations beginning with M1DATA(1) after filling M1DATA(120) and overwriting the locations beginning with V2DATA(1) after filling V2DATA(64). This overwriting is continuous so that upon completion of the data-gathering routine, M1DATA array 82 stores the 120 most recently obtained magnetic data values, representing a scanning interval of 0.3 second, or about 2.4 inches, along track T1, the oldest value being M1DATA(M1PTR) and the newest value being M1DATA(M1PTR−1). Similarly, upon completion of the data-gathering routine V2DATA array 94 stores the 64 most recently obtained optical data values, representing a scanning interval of 0.64 second, or about 5.12 inches, along track T2, the oldest value being V2DATA(V2PTR) and the newest value being V2DATA(V2PTR−1).

If outlet sensor V4 is actuated during the performance of this loop (step 124), the acceptor generates a reject code (REJCODE) of 0x44 (step 126) and transfers to a reject routine shown in FIG. 23 (step 128). If inlet sensor V1 becomes deactuated during the performance of this loop (step 130), the acceptor generates a reject code of 0x41 (step 132) and transfers to the reject routine of FIG. 23 (step 134). If more than 2.5 seconds elapses during the execution of the loop (step 136), the routine generates a reject code of 0x43 (step 138) before transferring to the reject routine (step 140).

Upon actuation of path sensor V3 (FIG. 1) by the leading edge of the bill B (step 122), the acceptor exits from the loop and resets the timer at 200 milliseconds (step 144). The acceptor then enters a second loop (steps 146–150) in which it repeatedly enters the IN_DATA subroutine of FIG. 10 to gather additional data (step 150) until either the outlet sensor V4 is actuated (step 146) or 200 milliseconds elapses (step 148). The subroutine then sets pointers PTR1 and PTR2 to the values of respective pointers M1PTR and V2PTR (step 152); as noted above, pointers M1PTR and V2PTR indicate the starting points—i.e., the locations of the oldest values—in M1DATA array 82 and in V2DATA array 94, respectively. the acceptor then delays 5 milliseconds (step 154) and resets the timer at 35 milliseconds (step 156). The acceptor then enters the MEASURE_MAG_PULSE subroutine of FIG. 11 three times (steps 158–162) to look for the three magnetic pulses that are characteristic of the beginning of the portrait area (FIG. 4) of the bill B. As will be described hereinbelow, the acceptor exits from the MEASURE_MAG_PULSE subroutine of FIG. 11 when it detects the leading edge of a magnetic pulse or when the timer runs out, whichever event occurs first.

After the MEASURE_MAG_PULSE subroutine has been executed three times or 35 milliseconds have elapsed, whichever occurs first, the acceptor initializes an array pointer M2PTR and a loop index I at 0 and 1, respectively (step 164), before entering a loop (steps 166–174) in which it measures the number of magnetic lines in each of the sections S1–S7 of the portrait area FIG. 4) of the bill B characteristic of various denominations. The acceptor enters the loop seven times, once for each of the sections S1–S7 of the portrait area. Upon each pass through the loop for a particular one of sections S1–S7, the acceptor first sets the timer at a value M2TIME(I) proportional to the length of the section SI, where I ranges between 1 and 7 (step 166). In the embodiment shown, the length of time spent traversing each of sections S1–S7 is shown in the following table:

| Section | Time (ms) |
|---|---|
| S1 | 27 |
| S2 | 30 |
| S3 | 30 |
| S4 | 30 |
| S5 | 20 |
| S6 | 20 |
| S7 | 20 |

After the timer has been set (step 166), the acceptor invokes the LINE_COUNT subroutine of FIG. 13 (step 168), which counts the number of pulses in a particular section characteristic of a $1 bill, a $10 bill and a $5 bill, respectively. The results of these counts are stored as respective values M2DATA(M2PTR), M2DATA(M2PTR+1) and M2DATA(M2PTR+2) in array 80 (FIG. 6). The acceptor then increments the array pointer M2PTR by 3 (step 170) and the loop index I by 1 (step 172) in preparation for another pass through the loop for a succeeding one of sections S1–S7. When all seven sections have been examined in this manner, the acceptor exits from the loop (step 174) and returns (step 176) to the main routine of FIG. 12 preparatory to entering the VALIDATE routine of FIGS. 14*a* and 14*b*.

Referring now to FIG. 10, the IN_DATA subroutine is entered at 10-millisecond intervals to count the number of magnetic pulses in four successive 2.5-millisecond (0.02 inch) portions of scanning track T1, as well as to ascertain the optical reflectance of a portion of optical scanning track T2 within a particular 10-millisecond (0.08 inch) window. Upon entering the subroutine (step 178), the acceptor initializes a quantity LAST_CHECK and a loop index I at 0 (step 180) before entering a loop (steps 182–196) that is executed four times, once for each 2.5-millisecond interval. Upon entering this loop, the acceptor sets a quantity COUNT equal to 0 and sets the timer at 2.5 milliseconds (step 182).

Figure 9A:
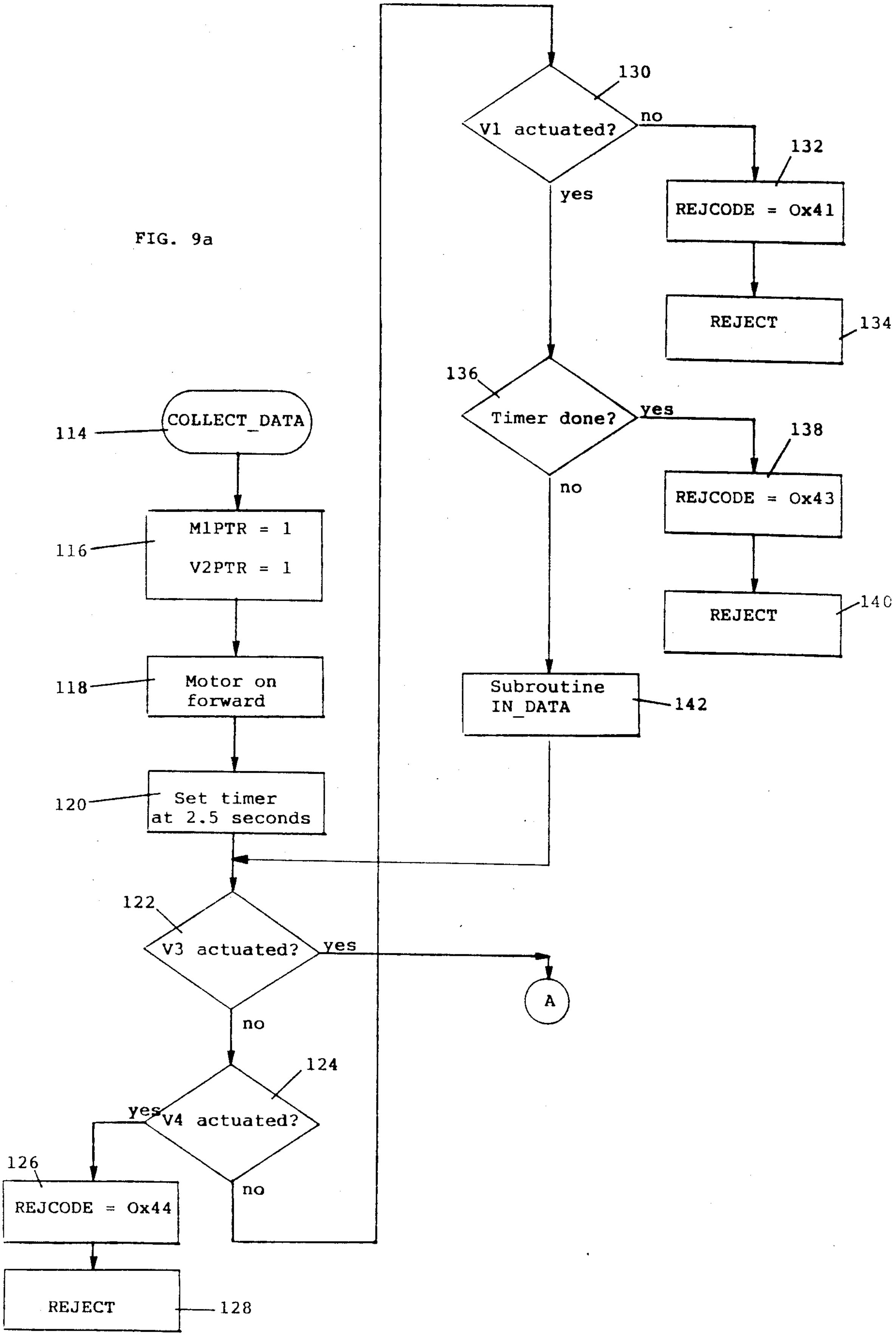
Figure 9B:
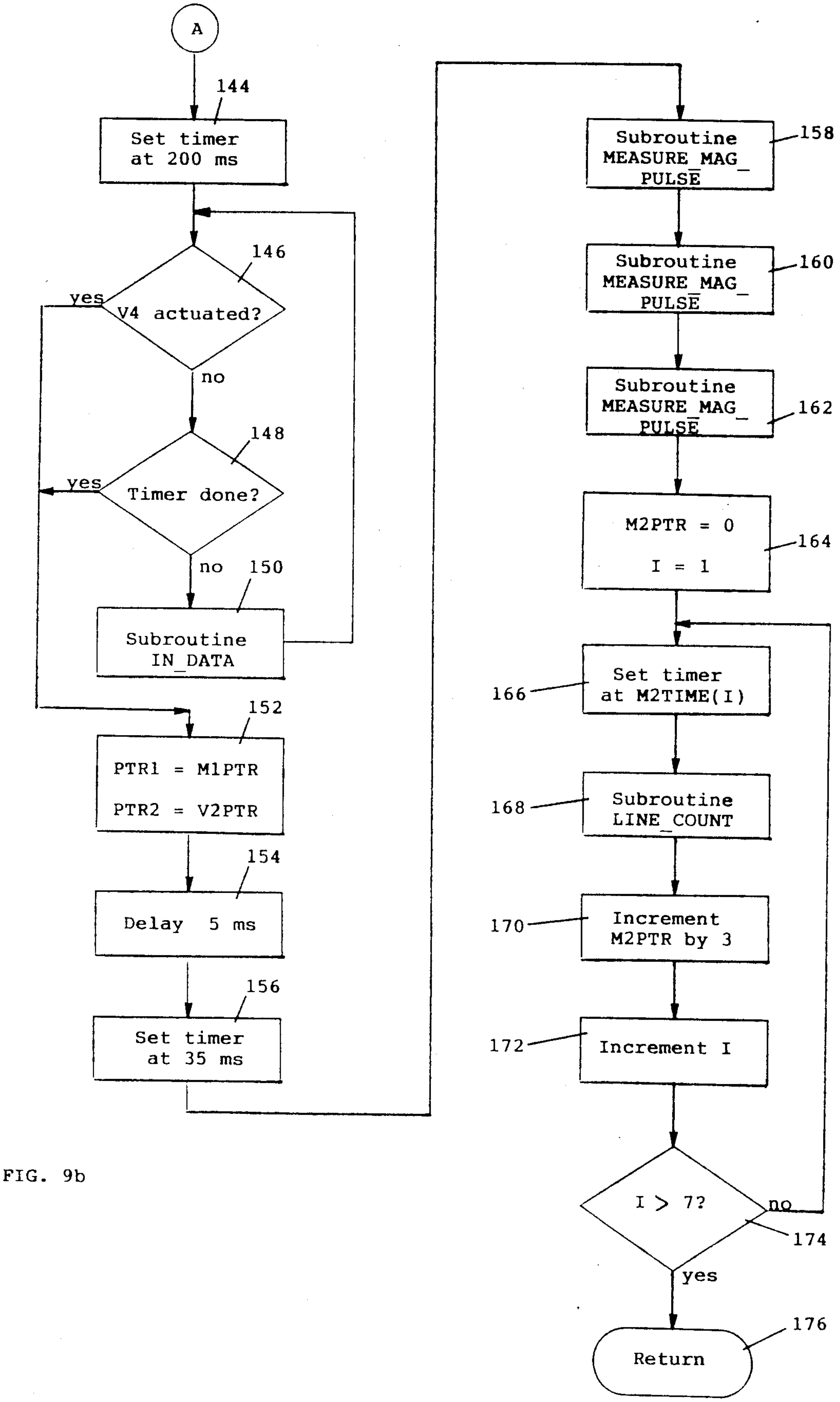

The acceptor then enters an inner loop (steps 184–192) in which it continues to count the leading edges of magnetic pulses from magnetic sensor M until 2.5 milliseconds have elapsed. More particularly, upon entering the inner loop, the acceptor increments the quantity COUNT and sets the quantity LAST_CHECK equal to 1 whenever the magnetic sensor M becomes newly actuated (steps 184, 188 and 190) and resets the quantity LAST_CHECK to 0 whenever the magnetic sensor M is newly deactuated (step 186). Upon completion of this inner loop at the end of 2.5 milliseconds (step 192), the acceptor sets the element M1DATA(M1PTR) of magnetic data array 82 equal to the number of magnetic pulses counted (COUNT) and increments the array index M1PTR and loop index I (step 194); if M1PTR is 120 at step 194, it is wrapped around to 1 to permit overwriting of previously stored data. Upon completion of the outer loop at the end of 10 milliseconds (step 196), the acceptor stores the current reflectance value V2 in the location V2DATA(V2PTR) of optical data array 94 (step 198) and increments the optical data array pointer V2PTR (step 200); if V2PTR is 64 at step 200, it is similarly wrapped around to 1 to permit overwriting of previously stored data. The acceptor then returns to step 142 or 150 of the COLLECT_DATA subroutine of FIGS. 9*a* and 9*b* (step 202).

Referring now to FIG. 11, the MEASURE_MAG_PULSE subroutine measures the interval between the start of the subroutine and the appearance of the leading edge of a pulse from magnetic sensor M. Upon entering this subroutine (step 204), the acceptor sets the variable WIDTH at 0 (step 206). The acceptor then enters two successive loops (steps 208–212 and 214–218), the effect of which is to increment the quantity WIDTH periodically (steps 212 and 218) until a leading edge has been detected (step 214) or the timer times out (step 210 or 216). The subroutine then returns (step 220) to step 158, 160 or 162 of the COLLECT_DATA subroutine shown in FIGS. 9*a* and 9*b*.

Referring now to FIG. 13, the LINE_COUNT subroutine is entered to count the number of magnetic lines in each of the sections S1–S7 of the portrait area of the bill B (FIG. 4) characteristic of a particular denomination. Upon entering the LINE_COUNT subroutine (step 222), the acceptor first initializes quantities M2DATA(M2PTR), M2DATA(M2PTR+1) and M2DATA(M2PTR+2) at 0 (step 224). Next, if the timer has not timed out (step 226), the acceptor invokes the MEASURE_MAG_PULSE subroutine (FIG. 12) to measure the width of the next magnetic line or, more precisely, the interval before the next leading edge quantities; the measured width is stored as quantity PULSE_WIDTH (sep 228). If a measured width PULSE_WIDTH is equal to or greater than a predetermined minimum $1_WIDTH_MIN for a $1 bill (step 230) and less than or equal to a predetermined maximum $1_WIDTH_MAX for a $1 bill (step 232) the acceptor increments M2DATA(M2PTR) (step 234). Similarly, if the measured width PULSE_WIDTH is equal to or greater than a predetermined minimum $10_WIDTH_MIN for a $10 bill (step 236) and less than or equal to a predetermined maximum $10_WIDTH_MAX for a $10 bill (step 238), the acceptor increments M2DATA(M2PTR+1) (step 240). Finally, if the measured width PULSE_WIDTH is at least equal to a predetermined minimum $5_WIDTH_MIN for a $5 bill (step 242) but no greater than a predetermined maximum $5_WIDTH_MAX for a $5 bill (step 244), the acceptor increments M2DATA(M2PTR +2) (step 246). When all of these comparisons have been made, the acceptor returns to step 226 for another examination of the timer before performing a new pulse-width measurement. When the timer finally times out (step 226), the acceptor returns (step 248) to step 168 of the COLLECT_DATA routine of FIGS. 9*a* and 9*b* (step 248).

Referring now to FIG. 14*a* and 14*b*, after entering the VALIDATE routine (step 250), the acceptor examines the oldest 23 values V2DATA(PTR2) through V2DATA(PTR+22) stored in the optical data array 94 (FIG. 8) to determine the probable edge of a bill B. This information is used to establish an initial alignment between arrays 94 and 96. The acceptor initially sets the loop index I at 0 (step 252) and enters a loop (steps 254–258) in which it examines each stored value V2DATA(PTR2+I) to determine whether its absolute value equals or exceeds a certain value (3 in this particular example). The output signal from photodetector V2 has a quiescent level of 0; thus, a leading edge of the bill B may cause the signal to deviate in either direction from that quiescent value. If none of the values V2DATA(PTR2) through V2DATA(PTR2+22) is at least 3 in absolute value, the acceptor exits from the loop (step 258), generates a reject code (REJCODE) of 0x48 (step 260) and jumps (step 262) to the REJECT routine shown in FIG. 23. If, on the other hand, one of the values V2DATA(PTR2) through V2DATA(PTR2+22) does equal or exceed 3 in absolute value, the acceptor sets a pointer V2PTR equal to PTR2+I−3 (step 264 . The array index PTR2+I is decremented here to give the pointer V2PTR an initial negative offset; this offset is successively incremented during the comparison to be described.

Next, the acceptor examines the oldest 25 values M1DATA(PTR1) through M1DATA(PTR1+24) stored in magnetic data array 82 (FIG. 7) to determine the probable leading edge of the magnetic data on bill B. This information is used to establish an initial alignment between arrays 82 and 84. The acceptor first sets a J register, indicating the cumulative magnetic count, to 0 (step 266), after which it sets the loop index I to 0 (step 268). The acceptor then enters a loop (steps 270–276) in which it increments the contents of the J register by the value M1DATA(PTR1+I) (step 270) and ascertains whether the contents of the J register are at least 5 (step 272). If the cumulative count of the J register fails to equal or exceed 5 within the first 25 passes through the loop, the acceptor exits from the loop (step 276), generates a reject code (REJCODE) of Ox49 (step 278), and transfers to the REJECT routine shown in FIG. 23 (step 280).

If the J count does equal or exceed 5 within the first 25 passes through the loop (steps 270–276), the acceptor exits from the loop immediately (step 272) and sets a pointer M1PTR equal to PTR1+I−3 (step 282). The array index PTR1+I is decremented here for the same purpose of providing an initial negative offset for the comparison operation to be described hereinbelow.

Next, the acceptor examines the contents of the M2DATA array 80 (FIG. 6) to make a tentative determination of denomination of bill B (steps 284–298) More particularly, for each of the $1, $10 and $5 denominations, the acceptor sums the values in M2DATA array 80 corresponding to that denomination for the portrait sections S1, S2, S5 and S6. The acceptor stores the sums as quantities CNT1, CNT10 and CNT5, respectively (steps 284–288). The acceptor then compares CNT10 with CNT1 and CNT5 (step 290). If CNT10 is greater than either of these quantities, the acceptor transfers to the BILL_10 routine shown in FIG. 17 (step 292). If CNT10 is not greater than both CNT1 and CNT5, the acceptor then determines whether CNT5 is greater than both CNT1 and CNT10 (step 294). If so, the acceptor transfers to the BILL_5 routine shown in FIG. 16 (step 296). Otherwise, the acceptor transfers to the BILL_1 routine shown in FIG. 15 (step 298).

Referring now to FIG. 15, the BILL_1 routine (steps 300–304) is entered if the acceptor tentatively determines the denomination of the bill B to be a $1 bill on the basis of the M2DATA values in array 80. After entering this routine (step 300) the acceptor performs the CALC_1_DEV(DENOM) routine (FIG. 18) for a $1 denomination (DENOM=0), and thereafter performs the CALC_V2_DEV(DENOM) routine (FIG. 20) for a $1 denomination (step 302). The CALC_M1_DEV(DENOM) routine calculates the minimum deviation between the magnetic data values in M2DATA array 82 and the magnetic reference values in M2REF array 84 for a $1 bill (DENOM=0), while the CALC_V2_DEV(DENOM) routine calculates the minimum deviation between the optical data values in V2DATA array 94 and the optical reference values in V2REF array 96 for a $1 bill (DENOM=0). After executing these routines, the acceptor enters a CHECK_LIMITS routine shown in FIG. 22, in which the acceptor determines whether the optical and magnetic deviations are within predetermined limits for a $1 bill (step 304).

Referring now to FIG. 16, the BILL_5 routine (steps 306–314) is entered if the acceptor tentatively determines the denomination of the bill B to be a $5 bill on the basis of the M2DATA data values in array 80. After entering the BILL_5 routine (step 306), the acceptor successively executes the CALC_M1_DEV(DENOM) routine (FIG. 18) for a $1 denomination (DENOM=0), $2 denomination (DENOM=1), $5 denomination (DENOM=2) and $50 denomination (DENOM=5) (step 308). After execution of the CALC_M1_DEV(DENOM) routine for all four of these denomination, the variable M1_DENOM will indicate the denomination for which the lowest magnetic deviation was found; for a $5 bill, the quantity M1_DENOM should equal 2. If M1_DENOM is found to be other than 2 (step 310) indicating that the bill B is other than a $5 bill, the acceptor generates a reject code (REJCODE) of 5 (step 312) and transfers to the REJECT routine shown in FIG. 23 (step 314). If, on the other hand, M1_DENOM does equal 2, as it should for a $5 bill, the acceptor executes (step 316) the CALC_V2_DEV(DENOM) routine (FIG. 20) for a $5 bill (DENOM=2). Upon completion, the CALC_V2_DEV(DENOM) routine will return a value V2_DEV indicating the minimum deviation between the optical reflectance data values in V2DATA array 94 and the optical reflectance reference values in V2_REF array 96 for a $5 bill (DENOM=2). The acceptor then transfers to the CHECK_LIMITS routine (FIG. 22), which checks the calculated deviations M1_DEV and V2_DEV against predetermined limits for a $5 bill (step 318).

Referring now to FIG. 17, the BILL_10 routine (steps 320–340) is entered whenever the acceptor tentatively determines the bill B to be a $10 or $20 bill on the basis of the M2DATA values in array 80. Upon entering this routine (step 320), the acceptor enters the CALC_M1_DEV(DENOM) routine (FIG. 18) for each possible denomination from a $1 bill (DENOM=0) through a $100 bill (DENOM=6) (step 322). Execution of the CALC_M1_DEV(DENOM) routine for each denomination will result in the generation of a quantity M1_DEV indicating the minimum deviation between the magnetic data values in M1DATA array 82 and the magnetic reference values in M1REF array 84, as well as a quantity M1_DENOM indicating the particular denomination for which the minimum deviation was found. The acceptor then tests the quantity M1_DENOM to determine whether it indicates either a $10 bill (M1_DENOM=3) (step 324) or a $20 bill (M1_DENOM=4) (step 326). If neither is the case, the acceptor generates a reject code (REJCODE) of 6 (step 328) and transfers to the REJECT routine shown in FIG. 23 (step 330).

If the quantity M1_DENOM is found to be either 3 or 4, indicating a $10 or $20 bill, the acceptor then executes the CALC_V2 DEV(DENOM) routine (FIG. 20) for a $2 denomination (DENOM=1), $10 denomination (DENOM=3) and $20 denomination (DENOM=20) (step 332). Upon execution of the CALC_V2_DEV(DENOM) routine for each of these three denominations, there will be generated a quantity of V2_DEV indicating the minimum deviation found for any of the denominations, as well as a quantity V2_DENOM indicating the denomination for which the minimum deviation was found. The acceptor then compares M1_DENOM with V2_DENOM to determine whether the magnetic and optical tests indicate the same denomination (step 334). If not, the acceptor generates a reject code (REJCODE) of 7 (step 336) and transfers to the REJECT routine of FIG. 18 (step 338). If M1_DENOM is the same as V2_DENOM, the acceptor transfers to the CHECK_LIMITS routine (FIG. 22) to determine whether the quantities M1_DEV and V2_DEV are within predetermined limits for a $10 or $20 bill (step 340).

Referring now to FIG. 18, the CALC_M1_DEV(DENOM) routine (steps 342-356) calculates the minimum deviation (MIN_DEV) between the magnetic data values in M1DATA array 82 and magnetic reference values in M1REF array 84 for a particular denomination DENOM for any value of position offset J. Upon entering the routine (step 342), the acceptor sets the quantity MIN_DEV to an initial high value of 127 and sets the variable J, which determines the degree of shifting between the M1DATA and M1REF arrays, at 0 (step 344). The acceptor then enters a loop (steps 346–350) in which it repeatedly enters the routine CALC_M1 shown in FIG. 19 (step 346) and then increments the shifting variable J (step 348) to alter the shifting between the M1_DATA array 82 and M1_REF array 84 (step 348). After the shifting variable J has been incremented to 6 (step 350), the acceptor examines the quantity MIN_DEV developed by the loop (steps 346–350) and determines whether it is less than the present value of M1_DEV (step 352). If not, the acceptor returns (step 356) to step 302, 308 or 322, depending on the identity of the calling routine. If MIN_DEV is less than the current value of M1_DEV, the acceptor sets M1_DEV equal to MIN_DEV and sets the indicator M1_DENOM equal to the quantity DENOM (step 354), supplied to the subroutine, before returning to the calling routine (step 356).

Referring now to FIG. 19, the CALC_M1 routine (steps 358–374) is entered to calculate the deviation between the values in the M1DATA array 82 and the values in the M1REF array 84 to determine the deviation between the two arrays for a particular denomination DENOM and degree of shifting J. Upon entering the routine (step 358) the acceptor initializes the deviation variable DEV at 0, sets the loop index I equal to 1, and sets the magnetic data array pointer PTR equal to the value M1PTR developed at step 282 (step 360). The acceptor then enters a loop comprising steps 362 through 368. On each pass through this loop, the acceptor first sets a quantity REF equal to M1REF(DENOM, I), then sets a quantity WT equal to the weighting function WT(DENOM, I) for that particular denomination and position, and then sets a quantity DATA equal to M1DATA(PTR+J) (step 362); as a particular example, on the first pass, with I equal to 1 and J equal to 0, REF is set equal to M1REF(DENOM, 1), while DATA is set equal to M1DATA (PTR) and WT is set equal to WT(DENOM, 1). The quantity DEV is then incremented by the absolute value of the difference between REF and DATA, multiplied by the weighting function WT (step 364). The quantities I and PTR are then incremented by 1 (step 366) in preparation for another pass through the loop. If, as assumed above, the shifting variable J is 0, execution of this loop for all values of I will result in a comparison of respective values of the data array 82 and reference array 84 as indicated by the arrows 88 in FIG. 7.

When all of the values M1REF(DENOM, 1) through M1REF(DENOM, 94) in the reference array 60 have been thus compared (Step 368), the acceptor examines the quantity DEV to determine whether it is less than the minimum deviation MIN_DEV for the particular denomination DENOM (step 370). If not, the acceptor simply returns (step 274) to step 346 of the CALC_MIN_DEV(DENOM) routine shown in FIG. 18. If the quantity DEV is less than $MIN_{13}$ DEV, then the acceptor sets the latter quantity equal to DEV (step 372) before returning (step 374) to step 346. After multiple calls to subroutine $CALC_{13}$ M1, $MIN_{13}$ DEV will have been set equal to the minimum deviation DEV calculated for any position offset J.

Referring now to FIG. 20, the CALC_V2_DEV(DENOM) routing (steps 376–398) is entered to calculate the minimum deviation (MIN_DEV) between the values in the optical data array 94 and the optical reference array 96 for a particular denomination DENOM for any combination of position offset J and amplitude offset Y_OFFSET. Upon entering the routine (step 376), the acceptor initially sets the quantity MIN_DEV at a high value of 255 (step 378) The acceptor then sets the position-shifting variable J at an initial value of 0 (step 380) before entering a main loop (steps 382–392) containing a subloop (steps 384–388). In the main loop, the position-shifting variable J is successively incremented by 1 (step 390) until it reaches a value of 5 (step 392), while in the subloop the amplitude-shifting variable Y_OFFSET, initially set to a value of −25 (step 382), is successively incremented by 3 (step 386) until it attains a value of+14 (step 388 In this manner, the CALC_V2 routine (FIG. 21) is entered (step 384) a total of 65 times, for 5 different values of the position-shifting variable J and 13 different values of the amplitude-shifting variable Y_OFFSET.

Upon exiting from the outer loop (steps 382–392) the acceptor will have generated a quantity MIN_DEV equal to the minimum deviation between the optical data array 94 and the optical reference array 96 for the denomination DENOM and for any values of the position-shifting variable J and the amplitude-shifting variable Y_OFFSET. The quantity MIN_DEV is then tested to determine whether it is less than the quantity V2_DEV, representing the current minimum of MIN_DEV for any denomination previously tested (step 394). If it is not, the routine returns (step 398 to step 302, 316 or 332, depending on the identity of the calling routine. If, on the other hand, MIN_DEV is less than V2_DEV, the acceptor sets V2_DEV equal to MIN_DEV and sets the denomination pointer V2_DENOM equal to the current denomination indicator DENOM (step 396) before returning to the calling routine (step 398).

Referring now to FIG. 21, the CALC_V2 routine (steps 400–418) is entered to calculate the deviation between the values of the optical data array 94 and the optical reference array 96 for particular values of the position-shifting variable J and amplitude-shifting variable Y_OFFSET. Upon entering this routine (step 400), the acceptor sets the quantity DEV equal to 0 (step 402) and sets the indices I and PTR equal to 1 and V2PTR, respectively (step 404). The acceptor then enters a loop (steps 406–412) in which it calculates and adds together the deviations between corresponding elements of the optical data array 94 and reference array 96. More particularly, the acceptor first sets the quantity REF equal to V2REF(DENOM, I), and the quantity DATA equal to V2DATA(PTR+J)+Y_OFFSET (step 406). The acceptor then increments the quantity DEV by the absolute value of the difference between the quantities REF and DATA calculated during step 406 (step 408) before incrementing the indices I and PTR (step 410) in preparation for another pass through the loop.

On the first pass through the loop comprising steps 406–412, in which the position-shifting variable J is 0, elements of the reference array 96 (FIG. 8) will be compared with elements of the data array 94 as indicated by the arrows 98. On a subsequent pass through the loop, with J equal to 1, elements of the reference array 96 will be compared with position-shifted elements of array 94 as indicated by the arrows 100 in FIG. 8. Finally, when the position-shifting variable J has been incremented to 4, elements of the reference array 96 will be compared with position-shifted elements of the data array 94 as indicated by arrows 102 in FIG. 8.

Upon exiting from the loop comprising steps 406–412, the acceptor examines the deviation sum DEV thus obtained to determine whether it is less than the current minimum MIN_DEV for that denomination (step 414). If it is not, the routine returns (step 418) directly to step 384 of the CALC_V2_DEV(DENOM) routine shown in FIG. 20. If, on the other hand, the quantity DEV is less than MIN_DEV, the acceptor sets MIN_DEV equal to DEV (step 416) before returning to the routine shown in FIG. 20. After multiple calls to subroutine CALC_V2, MIN_DEV will have been set equal to the minimum deviation DEV calculated for any combination of position offset J and amplitude offset Y_OFFSET.

Referring now to FIG. 22, the CHECK_LIMITS routine is entered from step 304, 318 or 340, depending on the tentative determination of the denomination of the bill B from the portrait data. Upon entering this routine (step 420), the acceptor checks the calculated minimum magnetic deviation M1_DEV to determine whether it is within predetermined limits (step 422). If it is not, then the acceptor immediately transfers (step 426) to the REJECT routine (FIG. 23). If M1_DEV is within predetermined limits, the acceptor then determines whether the calculated minimum optical deviation V2_DEV is within predetermined limits (step 424). If it is not, then the acceptor likewise transfers to the REJECT routine shown in FIG. 23 (step 426). If both M1_DEV and V2_DEV are within predetermined limits, then the acceptor generates a suitable CREDIT signal (step 428), which may be used, for example, to actuate a coin dispenser (not shown) or to increment the credit register (not shown) of a vending machine with which the currency acceptor is associated. In the embodiment shown, the CREDIT signal will indicate not only that bill B is a genuine bill but also the particular denomination of the bill. Next the acceptor deactuates the drive motor 58 of the transport 12 and momentarily enables the stacker 14 (FIG. 1) to cause the bill B to be fed to the stack (not shown) accumulated by stacker 14 (step 430). Thereafter, the acceptor returns to the main start in FIG. 12 (step 432) to await the insertion of another bill B into the inlet to the transport 12.

Referring now to FIG. 23, the reject routine is entered whenever the bill B is determined to be a spurious bill, or if misfeed is detected. Upon entering the REJECT routine (step 434), the acceptor reverses the direction of the drive motor 58 (step 436) to move the bill back out of the inlet of transport 12. After a suitable delay (step 438), which may be either a predetermined delay or determined in response to sheet sensors, the acceptor deactuates the drive motor 58 (step 440) and returns to the main start shown in FIG. 12 (step 442) in preparation for the insertion of another bill.

In summary, the system described above obtains a set of magnetic data values M1DATA(1) through M1DATA(120) representing the number of magnetic pulses along scanning track T1 on the front of the bill B (FIG. 7), as well as a set of optical data values V2DATA(1) through V2DATA(64) representing the optical reflectance along scanning track T2 on the back of the bill (FIG. 8). For each denomination DENOM the system also stores a set of magnetic reference values M1REF(DENOM, 1) through M1REF(DENOM, 94) indicating the number of magnetic pulses along the front of a genuine bill of denomination DENOM (FIG. 7), as well as a set of optical reference values V2REF(DENOM, 1) through V2REF(DENOM, 45) indicating the optical reflectance along the back of a genuine bill of denomination DENOM (FIG. 8).

For each trial denomination DENOM tested magnetically, the corresponding set of magnetic reference values M1REF(DENOM, 1) through M1REF(DENOM, 94) is compared with a plurality of position-shifted versions M1DATA(M1PTR+J) through M1DATA(M1PTR+93+J), of the magnetic data values, where J ranges between 0 and 5, to obtain a corresponding plurality of error figures DEV and a least error figure MIN_DEV. If more than one trial denomination is tested magnetically, a first indication M1_DENOM of the denomination of the bill B is generated on the basis of the denomination resulting in the minimum value (M1_DEV) for the least error figure MIN_DEV.

Similarly, for each trial denomination DENOM tested optically, the corresponding set of optical reference values V2REF(DENOM, 1) through V2REF(DENOM, 45) is compared with a plurality of position-shifted and amplitude-shifted versions V2DATA(V2PTR+J)+Y OFFSET through V2DATA(V2PTR+44+J)+Y_OFFSET of the optical data values, where J ranges between 0 and 4 in increments of 1 and Y_OFFSET ranges between −25 and +11 in increments of 3, to obtain a corresponding plurality of error figures DEV (step 408) and a least error figure MIN_DEV (steps 414–416). A second indication V2_DENOM of the denomination of the bill is generated on the basis of the denomination resulting in the minimum value (V2_DEV) for the least error figure MIN_DEV (steps 394–396). If the first and second indications M1_DENOM and V2_DENOM correspond, the minimum values M1_DEV and V2_DEV are checked against predetermined limits to produce an indication (CREDIT) of the genuineness of the bill B.

Certain variations on the system described above will be apparent and those skilled in the art. Thus, the error figure calculated could indicate the degree of match, rather than the degree of mismatch, between the data values and the reference values. In such a case, the figure largest in magnitude would indicate the greatest degree of match, and hence least error. Other error criteria, such as total square error or minimum error, could also be used. Further, while in the system described the data and reference values correspond to discrete locations along the scanning track, they could also be continuous functions of position, and the deviations between the two could be integrated using analog means to obtain error figures. Similarly, the shifting could be performed by analog means, using delay lines, for example, rather than digitally as shown. Finally, while the reference values are desirably stored in memory, they could also be provided by simultaneously scanning a reference document known to be genuine.

It will be seen that I have accomplished the objects of my invention. By systematically comparing shifted versions of the magnetic and optical data arrays with the corresponding reference arrays, my currency validator substantially eliminates errors due to misregistration along the scanning path. This in turn minimizes the false acceptance of spurious documents while simultaneously minimizing the false rejection of genuine documents. Further, by using the data itself to establish the proper registration, my currency validator minimizes the need for adjustment.

It will be understood that certain features and subcombinations are of utility and may be employed without reference to other features and combinations. This is contemplated by and within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of determining the genuineness of a document including the steps of obtaining a set of data values indicating a measurable property at successive locations along a portion of a tested document, storing a set of reference values indicating said property along a corresponding portion of a reference document, successively shifting one set of values relative to the other of said sets, comparing the values of said sets after each of said shifting steps to obtain a plurality of error figures and generating an indication of the genuineness of said tested document on the basis of the error figure indicating the least error.

2. A method as in claim 1 in which said tested document has an edge and carries indicia, said step of obtaining data values being carried out along a line from said edge, said shifting step being in the direction of said line to account for differences in the location of said indicia with reference to said edge in tested documents from said reference document.

3. A method as in claim 1 in which said storing and shifting and comparing steps are performed for each of a plurality of alternative documents, said method including the step of providing an indication of the identity of a tested document with reference to said alternative documents on the basis of said least error figures.

4. Apparatus for determining the genuineness of a document including in combination means for obtaining a set of data values indicating a measurable property at successive locations along a portion of a tested document, means for storing a set of reference values indicating said property along a corresponding portion of a reference document, means for successively shifting one of said sets of values relative to the other of said sets, comparing the values of said sets after each shifting operation to obtain a plurality of error figures and means responsive to said error figures for generating an indication of the genuineness of said tested document on the basis of that error figure indicating the least error.

5. Apparatus as in claim 4 in which said tested document has an edge and carries indicia, said means for obtaining data values operating along a line from said edge, said shifting means shifting said values in the direction of said line to account for differences in the location of said indicia with reference to said edge in tested documents compared with the reference document.

6. Apparatus as in claim 4 in which said means for obtaining a set of values comprises a sensor and means for moving a document to be tested past said sensor.

7. Apparatus as in claim 4 in which each of said storing and shifting and comparing means performs its function for a plurality of alternative reference documents, said apparatus including means responsive to said last error figures for providing an indication of the identity of a tested document with reference to said alternative documents.

8. Apparatus as in claim 4 in which said comparing means comprises means for summing the absolute values of the deviations between the values of said one of said sets and the corresponding values of a shifted version of the other of said sets.

9. Apparatus for testing the genuineness of a document having an edge and carrying indicia spaced inwardly of said edge, means for moving a document to be tested along a path crossing said edge, means located along said path for detecting the leading edge of said document, means located along said path downstream of said detecting means for acquiring a set of data values indicating a measurable property of said indicia at successive locations along a portion of a document being tested, means responsive to said detecting means for activating said data value acquiring means, means for storing a set of reference values indicating said property along a corresponding portion of a reference document, means for successively shifting one of said sets of values relative to the other set in the direction of said path by predetermined increments, comparing the values of said sets after each shifting operation to obtain a plurality of error figures and means responsive to said error figures for generating an indication of the genuineness of a tested document on the basis of that error figure indicating the least error to account for differences in the location of said indicia with reference to said edge in tested documents compared with the reference document.

10. A method as in claim 1 in which said shifted versions are shifted in amplitude by successive amounts relative to said one of said sets.

11. A method as in claim 2 including the step of examining said data values to establish an initial alignment between said data values and said reference values, said shifted versions being shifted in position relative to said initial alignment.

12. A method as in claim 1 in which said document is an article of paper currency.

13. A method as in claim 1 in which said measurable property is optical reflectance.

14. A method as in claim 1 in which said data values indicate the optical reflectance at successive locations along said portion of said document.

15. A method as in claim 1 in which said measurable property is magnetic permeability.

16. A method as in claim 1 in which said document is scanned magnetically to produce magnetic pulses, said data values indicating the number of magnetic pulses within successive locations along said portion of said document.

17. A method as in claim 1 in which said set of sample values is obtained by moving said document past a sensor.

18. A method as in claim 1 in which each of said error figures is obtained by summing the absolute values of the deviations between the values of said one of said sets and the corresponding values of a shifted version of said other of said sets.

19. Apparatus as in claim 4 in which said shifted versions are shifted in amplitude by successive amounts relative to said one of said sets.

20. Apparatus as in claim 5 including means for examining said data values to establish an initial alignment between said data values and said reference values, said shifted versions being shifted in position relative to said initial alignment.

21. Apparatus as in claim 4 in which said document is an article of paper currency.

22. Apparatus as in claim 4 in which said measurable property is optical reflectance.

23. Apparatus as in claim 4 in which said measurable property is magnetic permeability.

* * * * *

UNITED STATES PATENT AND TRADEMARK OFFICE

CERTIFICATE OF CORRECTION

PATENT NO. : 4,973,851

DATED : November 27, 1990

INVENTOR(S) : LARRY F. LEE

It is certified that error appears in the above-identified patent and that said Letters Patent is hereby corrected as shown below:

In Column 17, line 23, "the error figure" should read -- that error figure --.

In Column 17, line 63, "last" should read -- least --.

Signed and Sealed this

Seventeenth Day of March, 1992

*Attest:*

HARRY F. MANBECK, JR.

*Attesting Officer* *Commissioner of Patents and Trademarks*